United States Patent
Yoon et al.

(10) Patent No.: US 9,596,971 B2
(45) Date of Patent: Mar. 21, 2017

(54) ROBOT CLEANER AND CONTROL METHOD FOR THE SAME

(71) Applicant: SAMSUNG ELECTRONICS CO., LTD., Suwon (KR)

(72) Inventors: Sang Sik Yoon, Suwon (KR); Dong Won Kim, Hwaseong (KR); Jea Yun So, Suwon (KR); Seung Il Han, Sosa (KR); Jun Hwa Lee, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1104 days.

(21) Appl. No.: 13/652,879

(22) Filed: Oct. 16, 2012

(65) Prior Publication Data
US 2013/0098402 A1    Apr. 25, 2013

(30) Foreign Application Priority Data

Oct. 21, 2011    (KR) ......................... 10-2011-0108362
Mar. 5, 2012    (KR) ......................... 10-2012-0022329

(51) Int. Cl.
*A47L 11/00*    (2006.01)
*A47L 11/40*    (2006.01)
(Continued)

(52) U.S. Cl.
CPC ......... *A47L 11/4055* (2013.01); *A47L 9/0488* (2013.01); *A47L 9/0494* (2013.01);
(Continued)

(58) Field of Classification Search
CPC .. A47L 11/4055; A47L 11/33; A47L 11/4011; A47L 11/4069; A47L 9/0488; A47L 9/0494; G05D 1/0219
See application file for complete search history.

(56) References Cited

U.S. PATENT DOCUMENTS 5,309,592 A * 5/1994 Hiratsuka ........... A47L 11/4011
15/319
7,610,651 B2 * 11/2009 Baek ........................ A47L 5/14
15/345
(Continued)

FOREIGN PATENT DOCUMENTS

CN    101152062 A    4/2008
CN    101299154 A    11/2008
(Continued)

OTHER PUBLICATIONS

Chinese Office Action dated Feb. 16, 2016 in corresponding Chinese Patent Application No. 201210397327.8.
(Continued)

*Primary Examiner* — Thomas G Black
*Assistant Examiner* — Peter D Nolan
(74) *Attorney, Agent, or Firm* — Staas & Halsey LLP

(57) ABSTRACT

A robot cleaner and a control method for the same are disclosed. The robot cleaner and control method are capable of detecting malfunction of an auxiliary cleaning unit, and controlling travel of the robot cleaner in accordance with the detection result, to achieve efficient cleaning of an edge area even when there is an error in the auxiliary cleaning unit. The robot cleaner includes a plurality of auxiliary cleaning units mounted to a bottom portion of the robot cleaner such that the auxiliary cleaning units are extendable and retractable, a sensing unit to sense an extension, retraction, or rotation state of each of the auxiliary cleaning units, and a control unit to determine whether the auxiliary cleaning units operate normally, based on a sensing result of the sensing unit, and to control travel of the robot cleaner, based on a result of the determination.

14 Claims, 22 Drawing Sheets

(51) Int. Cl.
 *A47L 11/33* (2006.01)
 *A47L 9/04* (2006.01)
 *G05D 1/02* (2006.01)

(52) U.S. Cl.
 CPC ........... *A47L 11/33* (2013.01); *A47L 11/4011* (2013.01); *A47L 11/4069* (2013.01); *G05D 1/0219* (2013.01); *A47L 2201/04* (2013.01); *G05D 2201/0203* (2013.01)

(56) References Cited

U.S. PATENT DOCUMENTS

| | | | | |
|---|---|---|---|---|
| 2004/0076324 | A1* | 4/2004 | Burl | G05D 1/0246 |
| | | | | 382/153 |
| 2004/0148731 | A1* | 8/2004 | Damman | A47L 5/30 |
| | | | | 15/388 |
| 2005/0251292 | A1* | 11/2005 | Casey | G05D 1/0238 |
| | | | | 700/245 |
| 2005/0273967 | A1* | 12/2005 | Taylor | A47L 5/28 |
| | | | | 15/319 |
| 2006/0085095 | A1* | 4/2006 | Reindle | A47L 9/2821 |
| | | | | 700/258 |
| 2006/0190135 | A1 | 8/2006 | Lee et al. | |
| 2010/0037418 | A1* | 2/2010 | Hussey | A47L 5/30 |
| | | | | 15/319 |
| 2010/0125968 | A1* | 5/2010 | Ho | A47L 5/00 |
| | | | | 15/319 |
| 2010/0194325 | A1* | 8/2010 | Dixon | 318/490 |

FOREIGN PATENT DOCUMENTS

| | | |
|---|---|---|
| CN | 1017556677 A | 6/2010 |
| GB | 2 344 750 | 6/2000 |
| JP | 4-328607 | 11/1992 |
| JP | 2006-26028 | 2/2006 |
| JP | 2011-45694 | 3/2011 |
| KR | 10-2010-0133870 | 12/2010 |
| WO | 00/07492 | 2/2000 |

OTHER PUBLICATIONS

Extended European Search Report dated Mar. 31, 2016 in corresponding European Patent Application No. 12189253.3.
Notification of Granting of Patent Right to Invention issued Sep. 2, 2016 in corresponding Chinese Patent Application No. 201210397327.8 (total of 4 pages).

* cited by examiner

ROBOT CLEANER AND CONTROL METHOD FOR THE SAME

CROSS-REFERENCE TO RELATED APPLICATIONS

This application claims the benefit of Korean Patent Application Nos. 10-2011-0108362 and 10-2012-0022329, respectively filed on Oct. 21, 2011 and Mar. 5, 2012 in the Korean Intellectual Property Office, the disclosures of which are incorporated herein by reference.

BACKGROUND

1. Field

Embodiments of the present disclosure relate to a robot cleaner and a control method for the same, which are capable of appropriately controlling a travel operation when malfunction of an auxiliary cleaning unit occurs.

2. Description of the Related Art

A robot cleaner is a device to automatically to clean a region to be cleaned by sucking foreign matter such as dust from a floor of the cleaning region while autonomously traveling about the cleaning region without being operated by a user.

Such a robot cleaner senses an obstacle or wall disposed within a cleaning region, using various sensors, and controls a travel path and a cleaning operation, based on the sensing result.

The robot cleaner repeatedly performs a cleaning task while traveling on a floor in accordance with a predetermined travel pattern. When there is an obstacle or wall in a cleaning region, it may be difficult for a main brush to reach a portion of the floor contacting the obstacle or wall. As a result, cleaning may be ineffectively achieved.

The robot cleaner is equipped with auxiliary cleaning units, which are outwardly protruded from the robot cleaner. Such auxiliary cleaning units are mounted to opposite sides of a cleaner body, to rake dust or the like on the floor into the cleaner body through rotation.

However, when the auxiliary cleaning units malfunction due to errors generated therein, effective cleaning may not be performed for a portion of the floor contacting the obstacle or wall, for example, an edge area, even though the robot cleaner travels while being adjacent to the edge area. Thus, the conventional robot cleaner may not achieve efficient cleaning when there is an error in the auxiliary cleaning units.

SUMMARY

Therefore, it is an aspect of the present disclosure to provide a robot cleaner and a control method for the same, which are capable of detecting malfunction of an auxiliary cleaning unit, and controlling travel of the robot cleaner in accordance with the detection result, to achieve efficient cleaning of an edge area even when there is an error in the auxiliary cleaning unit.

Additional aspects of the disclosure will be set forth in part in the description which follows and, in part, will be apparent from the description, or may be learned by practice of the disclosure.

In accordance with one aspect of the present disclosure, a robot cleaner for removing foreign matter from a floor while traveling on the floor includes a plurality of auxiliary cleaning units mounted to a bottom portion of the robot cleaner such that the auxiliary cleaning units are extendable and retractable, a sensing unit to sense an operation state of each of the auxiliary cleaning units, and a control unit to determine whether the auxiliary cleaning units operate normally, based on a sensing result of the sensing unit, and to control travel of the robot cleaner, based on a result of the determination.

The sensing unit may sense at least one of extension, retraction, and rotation states of the plural auxiliary cleaning units. The control unit may determine whether the plural auxiliary cleaning units operate normally.

The control unit may determine whether the sensing result received from the sensing unit after transmission of a command to operate each of the auxiliary cleaning units corresponds to the command.

When the sensing result from the sensing unit does not correspond to the command, the control unit may repeat the transmission of the command, the sensing result reception and the determination until the sensing result from the sensing unit corresponds to the command or a number of repetition times reaches a predetermined value. When the sensing result of the sensing unit does not correspond to the command even after the number of repetition times reaches the predetermined value, the control unit may determine that the auxiliary cleaning unit does not normally operate.

When the control unit determines that one of the plural auxiliary cleaning units does not normally operate, the control unit may control travel of the robot cleaner such that the at least one auxiliary cleaning unit, which operates normally among the plural auxiliary cleaning units, travels along an area adjacent to an edge portion of a cleaning region.

When the control unit determines that one of the plural auxiliary cleaning units does not normally operate, for wall tracing travel, the control unit may control travel of the robot cleaner such that the at least one auxiliary cleaning unit, which operate normally among the plural auxiliary cleaning units, travel along the wall of a cleaning region.

When the control unit determines that one of the plural auxiliary cleaning units does not normally operate, for zigzag travel, the control unit controls travel of the robot cleaner such that the at least one auxiliary cleaning unit, which operates normally among the plural auxiliary cleaning units, travels zigzag from an area adjacent to the normally operating auxiliary cleaning units to the opposite area of a cleaning region.

The control unit may control travel of the robot cleaner such that the at least one auxiliary cleaning unit, which operates normally among the plural auxiliary cleaning units, again travels along the area adjacent to the edge portion of the cleaning region, cleaning of which has not been executed.

The plural auxiliary cleaning units may include an auxiliary cleaning unit mounted to a left side of the robot cleaner and an auxiliary cleaning unit mounted to a right side of the robot cleaner. When the control unit determines that the left auxiliary cleaning unit does not normally operate among the plural auxiliary cleaning unit, for spiral travel, the control unit may control travel of the robot cleaner such that the robot cleaner executes spiral travel in a counterclockwise direction. When the control unit determines that the right auxiliary cleaning unit does not normally operate among the plural auxiliary cleaning unit, after transmitting the command to the plural auxiliary cleaning units, for spiral travel, the control unit may control travel of the robot cleaner such that the robot cleaner executes spiral travel in a clockwise direction.

The control unit may repeat the determination as to whether the auxiliary cleaning units operate normally, at predetermined intervals, after it is determined that at least one of the auxiliary cleaning units does not normally operate, and may then control travel of the robot cleaner such that a current travel mode of the robot cleaner is returned to an original travel mode, when it is determined that all the auxiliary cleaning units, which have not normally operated, operates normally.

The robot cleaner may further include an indicator to visibly and audibly notify an abnormal operation of the auxiliary cleaning units when the control unit determines that the at least one auxiliary cleaning unit do not normally operate.

The sensing unit may include at least one of a contact sensor, with which each of the auxiliary cleaning units comes into contact in an extended state, an encoder mounted to a driver which drives each of the auxiliary cleaning units, and a Hall sensor mounted to the driver, the sensing unit senses the extension and retraction state of each of the auxiliary cleaning units.

The sensing unit comprises at least one of an encoder mounted to a driver which drives the rotation of each of the auxiliary cleaning tools, and a Hall sensor mounted to the driver, the sensing unit senses the rotation state of each of the auxiliary cleaning units.

The sensing unit comprises at least one of a contact sensor, an encoder and a Hall sensor, to sense at least one of the extension, retraction and rotation state of each of the auxiliary cleaning units.

In accordance with another aspect of the present disclosure, a control method for a robot cleaner including a plurality of auxiliary cleaning units mounted to be extendable and retractable, includes transmitting a command to operate the plural auxiliary cleaning units, sensing an operation state of each of the plural auxiliary cleaning units, determining, based on a result of the sensing, whether each of the plural auxiliary cleaning units operates normally in accordance with the command, and controlling travel of the robot cleaner based on a result of the determination.

The operation state includes at least one of extension, retraction and rotation of the plurality of auxiliary cleaning units.

The determining whether each of the plural auxiliary cleaning units operates normally may include determining whether the sensed operation state of the auxiliary cleaning unit corresponds to the command.

The control method may further include, when the sensed operation state of the auxiliary cleaning unit does not correspond to the command, repeating the transmission of the command, the operation state sensing and the determination until the sensed operation state of the auxiliary cleaning unit corresponds to the command or a number of times of the repetition reaches a predetermined value, and determining that the auxiliary cleaning unit does not normally operate, when the sensed operation state of the auxiliary cleaning unit does not correspond to the command even after the number of times of the repetition reaches the predetermined value.

The controlling travel of the robot cleaner based on a result of the determination may include controlling travel of the robot cleaner, when it is determined that one of the plural auxiliary cleaning units does not normally operate, such that the at least one auxiliary cleaning unit; which operates normally among the plural auxiliary cleaning units, travels along an area adjacent to an edge portion of a cleaning region.

The controlling travel of the robot cleaner may include controlling travel of the robot cleaner, when the command is associated with wall tracing travel, such that the at least one auxiliary cleaning unit, which operates normally among the plural auxiliary cleaning units, travels along the wall of the cleaning region.

The controlling travel of the robot cleaner comprises controlling travel of the robot cleaner, when the command is associated with zigzag travel, such that the auxiliary cleaning units, which operates normally among the plural auxiliary cleaning units, travels zigzag from an area adjacent to the normally operating auxiliary cleaning units to the opposite area of a cleaning region.

The controlling travel of the robot cleaner may include controlling travel of the robot cleaner, such that the at least one auxiliary cleaning unit, which operates normally among the plural auxiliary cleaning units, again travels along the area adjacent to the edge portion of the cleaning region, cleaning of which has not been executed.

The plural auxiliary cleaning units may include an auxiliary cleaning unit mounted to a left side of the robot cleaner and an auxiliary cleaning unit mounted to a right side of the robot cleaner. The controlling travel of the robot cleaner may include controlling travel of the robot cleaner such that the robot cleaner executes spiral travel in a counterclockwise direction when the command is associated with spiral travel and it is determined that the left auxiliary cleaning unit does not normally operate, and controlling travel of the robot cleaner such that the robot cleaner executes spiral travel in a clockwise direction when the command is associated with spiral travel and it is determined that the right auxiliary cleaning unit does not normally operate.

The control method may further include repeating the determination as to whether the auxiliary cleaning units operate normally, at predetermined intervals when it is determined that at least one of the auxiliary cleaning units does not normally operate, and then controlling travel of the robot cleaner such that a current travel mode of the robot cleaner is returned to an original travel mode when it is determined that the all auxiliary cleaning units, which have not normally operated, operates normally.

The control method may further include visibly and audibly notifying an abnormal operation of the auxiliary cleaning unit when it is determined that the at least one auxiliary cleaning unit does not normally operate.

The sensing the operation state of each of the plural auxiliary cleaning units may be executed using at least one of a contact sensor, with which each of the auxiliary cleaning units comes into contact in an extended state, an encoder mounted to a driver which drives each of the auxiliary cleaning units, and a Hall sensor mounted to the driver, the sensing including sensing the extension and retraction state of each of the auxiliary cleaning units.

The sensing the operation state of each of the plural auxiliary cleaning units is executed using at least one of a contact sensor, with which each of the auxiliary cleaning units comes into contact in the extended state, an encoder mounted to a driver which drives each of the auxiliary cleaning units, and a Hall sensor mounted to the driver, the sensing including sensing the extension and retraction state of each of the auxiliary cleaning units.

The sensing the operation state of each of the plural auxiliary cleaning units is executed using at least one of an encoder mounted to a driver which drives each of the auxiliary cleaning units, and a Hall sensor mounted to the driver, the sensing including sensing the rotation state of each of the auxiliary cleaning units.

The sensing the operation state of each of the plural auxiliary cleaning units is executed using at least one of a contact sensor, an encoder and a Hall sensor, the sensing including at least one of sensing the extension, retraction and rotation state of each of the auxiliary cleaning units.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
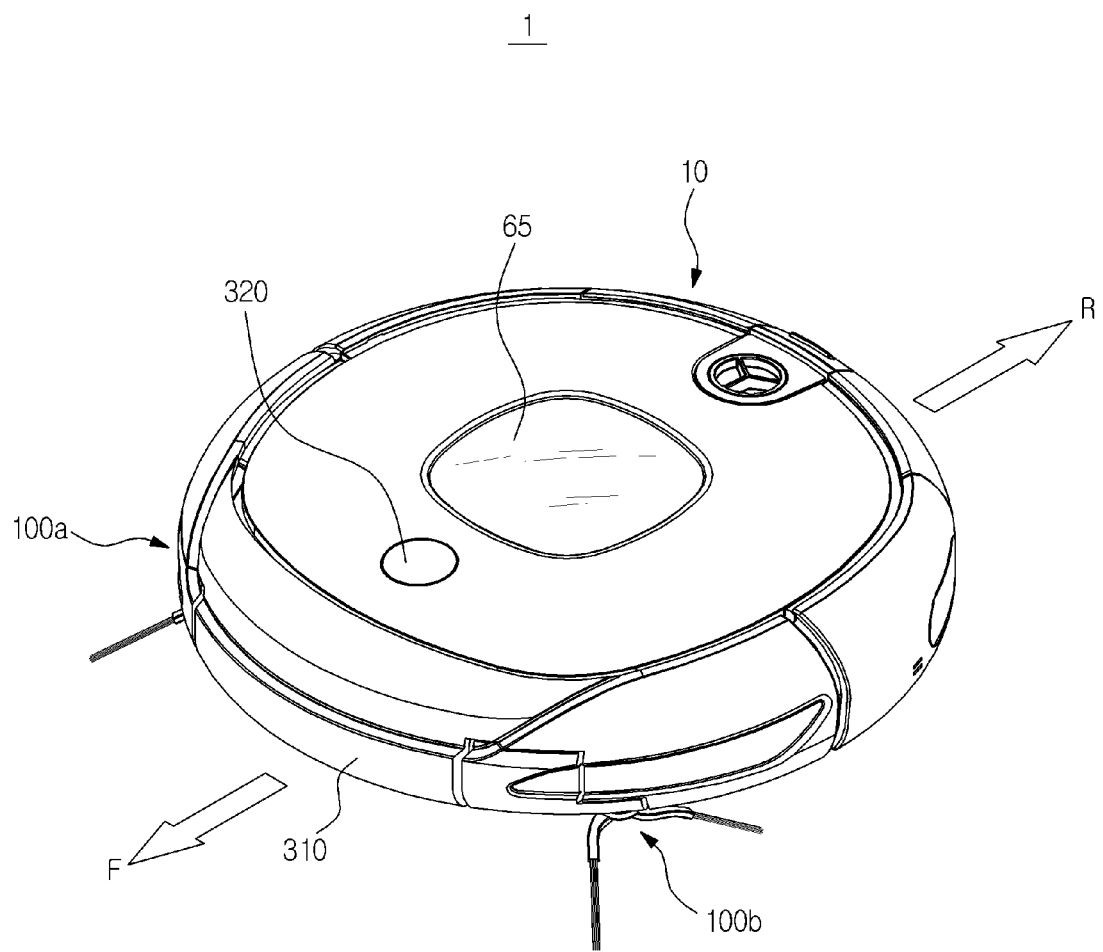
FIG. 1 is a perspective view of a robot cleaner according to an exemplary embodiment of the present disclosure.

Reference will now be made in detail to embodiments, examples of which are illustrated in the accompanying drawings, wherein like reference numerals refer to the like elements throughout. The embodiments are described below to explain the present disclosure by referring to the figures.

Hereinafter, embodiments of the present disclosure will be described with reference to the accompanying drawings.

Figure 2:
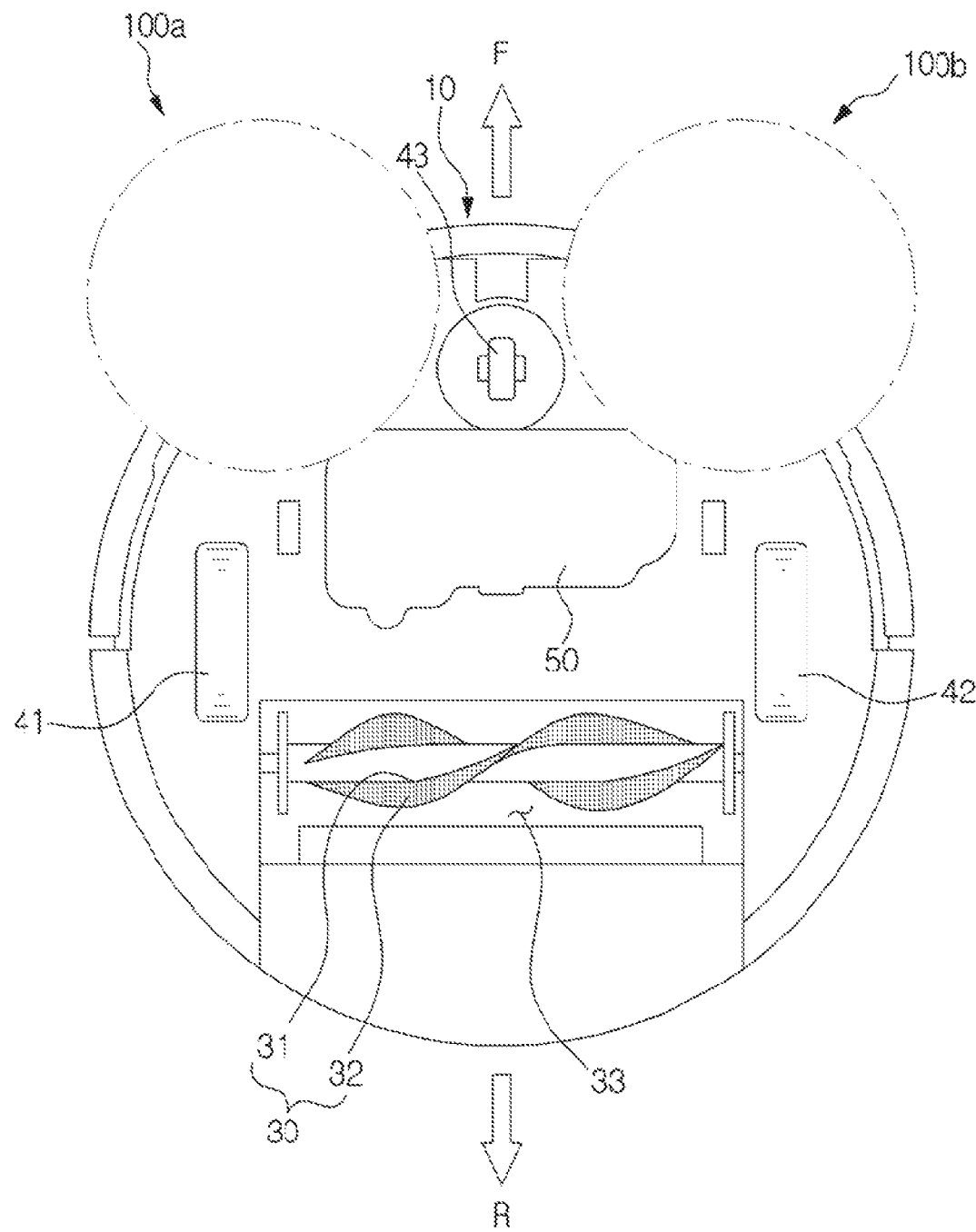
FIG. 2 is a bottom view of the robot cleaner according to the illustrated embodiment of the present disclosure.

FIG. 1 shows a perspective view of a robot cleaner according to an exemplary embodiment of the present disclosure. FIG. 2 shows a bottom view of the robot cleaner according to the illustrated embodiment of the present disclosure.

Referring to FIGS. 1 and 2, the robot cleaner 1, includes a body 10 to define an outer appearance of the robot cleaner 1, a main brush unit 30 to sweep dust on a floor such that the swept dust is guided to a suction inlet, a power supply 50 to supply drive power to drive the body 10, drive wheels 41 and 42 and a caster 43 to drive the body 10, and auxiliary cleaning units 100a and 100b to clean areas of the floor disposed adjacent to a wall and edge areas of the floor.

The drive wheels 41 and 42, are centrally arranged at opposite sides of a bottom portion of the body 10 in a symmetrical manner, respectively. The drive wheels 41 and 42 may perform movement operations including forward movement, backward movement, and rotation during execution of cleaning.

The caster 43 is installed at a front portion of the bottom of the body 10 when viewed on the basis of a travel direction. The caster 43 varies a rotation angle thereof in accordance with the state of the floor, on which the robot cleaner 1 travels, to allow the body 10 to keep a stable posture. The drive wheels 41 and 42, and caster 43 may be configured into a single assembly detachably mounted to the body 10.

The power supply 50 includes a battery electrically connected to the body 10 and drivers to drive various elements mounted to the body 10, to supply drive power to the body 10 and drivers. The battery is constituted by a rechargeable secondary battery. When the body 10 is coupled to a docking station (not shown) after completing a cleaning operation, the battery receives electric power from the docking station, to be charged.

The main brush unit 30 is mounted at an opening formed at a portion of the bottom of the body 10 biased from a central region of the body 10 in a rear direction R.

The main brush unit 30 removes foreign matter such as dust accumulated on the floor, on which the body 10 is disposed. The opening of the bottom of the body 10, at which the main brush unit 30 is mounted, functions as a dust inlet 33.

The main brush unit 30 includes a roller 31, and a main brush 32 installed in an outer surface of the roller 31. As the roller 31 rotates, the main brush 32 sweeps dust accumulated on the floor such that the swept dust is guided to the dust inlet 33. The roller 31 may be made of steel, but embodiments of the present disclosure are not limited thereto. The main brush 32 may be made of various materials having elasticity.

Although not shown, a fan unit to generate suction force is provided within the dust inlet 33. The fan unit functions to move dust introduced into the dust inlet 33 to a dust collector 55.

A sensing unit 300 is mounted to the body 10, to sense the surroundings of the robot cleaner 1. The sensing unit 300 may include a proximity sensor and/or a vision sensor. For example, when the robot cleaner 1 travels in a random direction under the condition that there is no predetermined path, along which the robot cleaner 1 travels, that is, in a cleaning system having no map, the robot cleaner 1 may travel about a cleaning region, using a proximity sensor 310. On the other hand, when the robot cleaner 1 travels along a predetermined path, that is, in a cleaning system requiring a map, a vision sensor 320 may be installed to receive position information of the robot cleaner 1, and thus to create a map. The sensing unit 300 may be implemented in various manners.

A display unit 65 is provided to display various states of the robot cleaner 1. For example, the display unit 65 may display a charged state of the battery, whether or not the dust collector 55 is full of dust, a mode of the robot cleaner, for example, a cleaning mode or a dormant mode, etc.

Although not shown, the robot cleaner may include an input unit 70 (see FIG. 7) to receive commands associated with various modes such as a travel mode and a cleaning mode, power on/off commands, etc. in accordance with an embodiment of the present disclosure.

Hereinafter, the configuration and structure of each auxiliary cleaning unit included in the robot cleaner according to the illustrated embodiment of the present disclosure will be described with reference to FIGS. 3 to 6.

Each auxiliary cleaning unit is mounted to the bottom portion of the robot cleaner such that it is extendable and retractable. The structure, which enables the auxiliary cleaning unit to be extendable and retractable, may be implemented through various embodiments. In the following description, two embodiments will be described.

Figure 3:
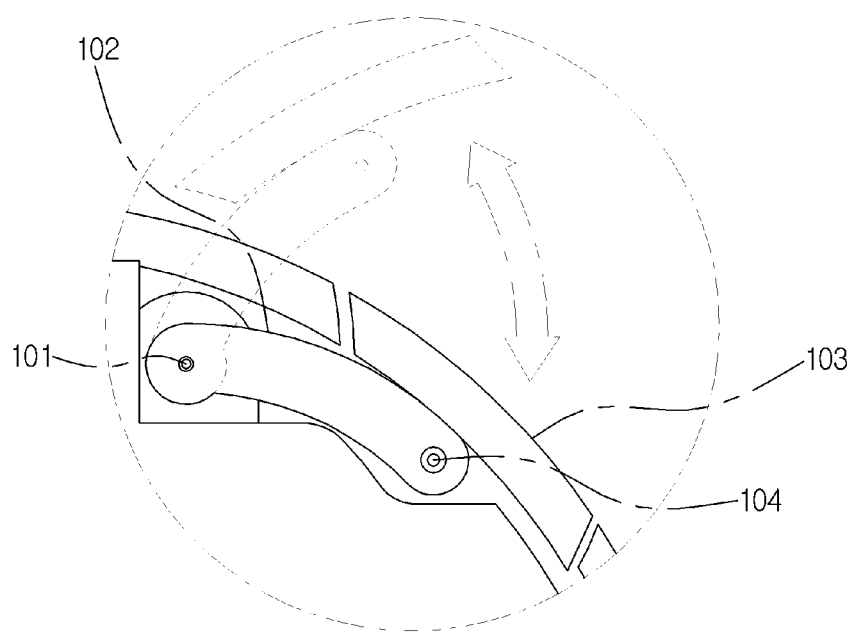
FIG. 3 is a view schematically illustrating one embodiment associated with the structure of enabling each auxiliary cleaning unit to be extendable and retractable.

FIG. 3 is a view schematically illustrating an embodiment associated with the structure of enabling each auxiliary cleaning unit to be extendable and retractable.

Referring to FIG. 3, each auxiliary cleaning unit 100a or 100b includes a side arm 102 and a periphery cover 103. The periphery cover 103 may be attached to one side of the side arm 102.

The side arm 102 is coupled to a front portion of the bottom of the body 10 at one side of the body 10. An arm motor (not shown) is received in the body 10 over the side arm 102, to drive the side arm 102. The arm motor is connected to a rotation shaft (not shown) via gears to transmit drive force to the side arm 102. The rotation shaft is mounted to a coupling groove 101 formed at one end of the side arm 102.

When the arm motor drives, the rotation shaft is rotated, thereby causing the side arm 102 to pivot about the coupling groove 101. In this case, the side arm 102 pivots outwardly of the body 10. In this state, the periphery cover 103 no longer covers the opening of the body 10. That is, the periphery cover 103 no longer forms the periphery of the body 10.

A coupling groove 104, to which an auxiliary cleaning tool is coupled, is formed at the other end of the side arm 102. A rotation motor (not shown) is received in the body over the coupling groove 104, to drive the auxiliary cleaning tool. The auxiliary cleaning tool is rotated about the coupling groove 104 by drive force of the rotation motor.

Figure 4:
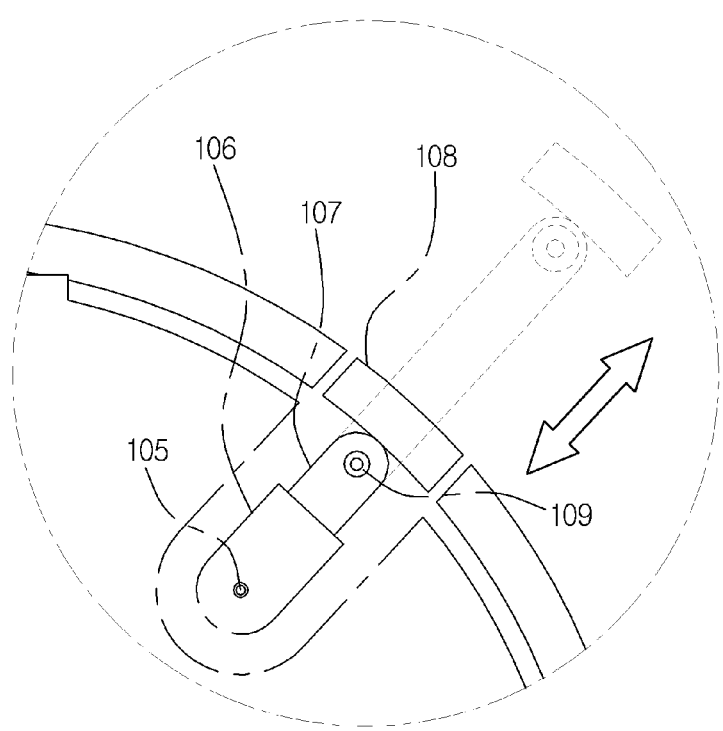
FIG. 4 is a view schematically illustrating another embodiment associated with the structure of enabling each auxiliary cleaning unit to be extendable and retractable.

FIG. 4 is a view schematically illustrating another embodiment associated with the structure of enabling each auxiliary cleaning unit to be extendable and retractable.

Referring to FIG. 4, each auxiliary cleaning unit 100a or 100b includes a side arm 106 and a periphery cover 108. The periphery cover 108 may be attached to one side of the extension arm 107.

The side arm 106 is coupled to a front portion of the bottom of the body 10 at one side of the body 10 via a coupling groove 105. An extension arm 107 is received in the side arm 106 such that it is extendable outwardly of the side arm 106 in a sliding manner.

The extension arm 107 moves forward and rearward within the side arm 106 in a longitudinal direction of the side arm 106. A rail is formed within the side arm 106, and a guide (not shown), which is engaged with the rail, is formed at the extension arm 107. Accordingly, the extension arm 107 may slidably move along the rail in a state of being coupled to the rail. Another extension arm may be received in the extension arm 107 such that it is extendable outwardly of the extension arm 107 in a sliding manner. The movement of the another extension arm may be performed in the same manner as described above. There is no limitation as to the number of extension arms.

An arm motor (not shown) is received in the body 10 over the side arm 106, to drive the side arm 106. The arm motor transmits drive force to the extension arm 107 via gears. When the arm motor drives, the extension arm 107 slides outwardly of the side arm 106, to extend outwardly of the body 10. In this state, the periphery cover 108 no longer covers the opening of the body 10. That is, the periphery cover 108 no longer forms the periphery of the body 10.

A coupling groove 109, to which an auxiliary cleaning tool is coupled, is formed at one end of the extension arm 107. A rotation motor (not shown) is received in the body over the coupling groove 109, to drive the auxiliary cleaning tool. The auxiliary cleaning tool is rotated about the coupling groove 109 by drive force of the rotation motor.

The auxiliary cleaning tool, which is also included in the auxiliary cleaning unit, performs cleaning. The auxiliary cleaning tool may include a brush to sweep or disperse foreign matter such as dust, a floorcloth to wipe the floor, or a suction device to suck foreign matter such as dust. Of course, these examples are illustrative and, as such, there is no limitation as to the kind of the auxiliary cleaning tool applied to the embodiments of the present disclosure as long as the auxiliary cleaning tool performs auxiliary cleaning.

Figure 5:
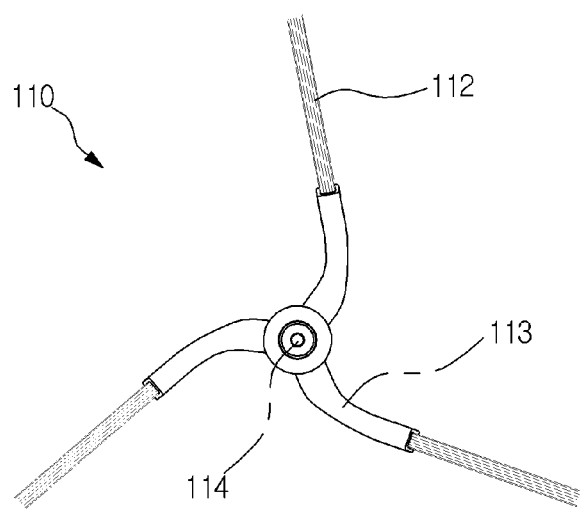
FIG. 5 is a view schematically illustrating a configuration of the auxiliary cleaning tool according to an exemplary embodiment of the present disclosure.

FIG. 5 is a view schematically illustrating a configuration of the auxiliary cleaning tool according to an exemplary embodiment of the present disclosure.

Referring to FIG. 5, the auxiliary cleaning tool 110, includes brush arms 113 coupled to form a central common end such that they outwardly extend in a radial direction from the central common end while being spaced apart from one another in a circumferential direction. An auxiliary brush 112 is coupled to each brush arm 113. A rotation shaft 114 is formed at the central common end of the brush arms 113. The rotation shaft 114 extends to be coupled to the side arm 102 via the coupling groove 104 or extension arm 107 via the coupling groove 109. When the auxiliary cleaning tool 110 rotates, the auxiliary brush 112 sweeps dust accumulated on an area disposed adjacent to a wall toward the central region of the body 10 or disperses the dust.

Figure 6:
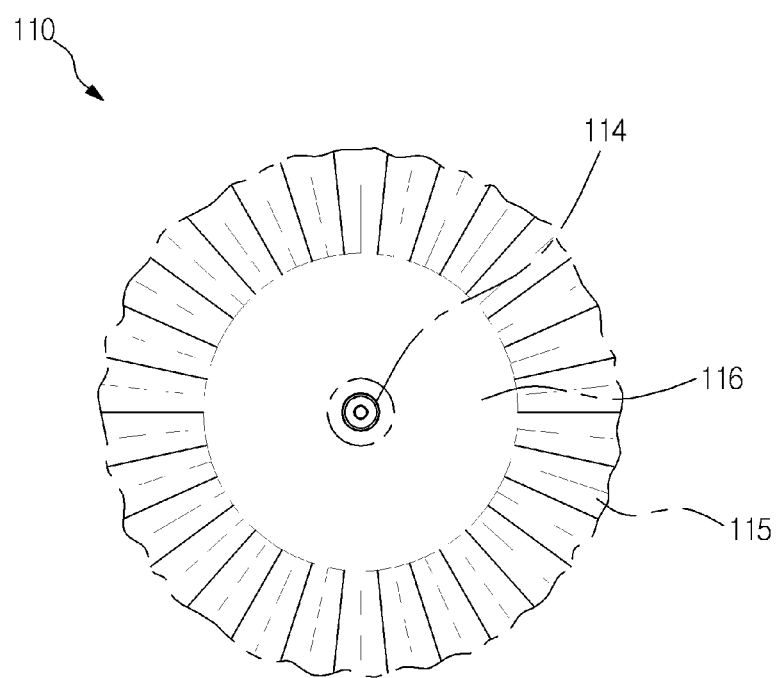
FIG. 6 is a view schematically illustrating a configuration of the auxiliary cleaning tool according to another embodiment of the present disclosure.

FIG. 6 is a view schematically illustrating a configuration of the auxiliary cleaning tool according to another embodiment of the present disclosure.

Referring to FIG. 6, the auxiliary cleaning tool 110 includes a circular floorcloth holder 116. An auxiliary floorcloth 115 is fitted around the floorcloth holder 116 in a radial direction. A rotation shaft 114 is formed at a center of the floorcloth holder 116 such that it axially extends. The rotation shaft 114 receives drive force from a rotation motor, to rotate the auxiliary cleaning tool 110. The rotation shaft 114 is coupled to the side arm 102 via the coupling groove 104 or extension arm 107 via the coupling groove 109. When the auxiliary cleaning tool 110 rotates, the auxiliary floorcloth 115 scrubs an area disposed adjacent to a wall.

When the embodiment of FIG. 6 is applied together with the embodiment of FIG. 4, the cleaning operation of the auxiliary cleaning unit 100 may include not only rotation of the auxiliary cleaning tool 110, but also repeated extension and retraction of the extension arm 106. Otherwise, the cleaning operation may be performed only through repeated extension and retraction of the side arm 102 or extension arm 107 without rotation of the auxiliary cleaning tool 110.

The auxiliary brush 112 may be made of various materials having elasticity. The auxiliary floorcloth 115 may be made of a fiber material or various materials other than the fiber material.

The robot cleaner 1 according to the illustrated embodiment of the present disclosure may clean even an area of the floor disposed adjacent to a wall or an edge area of the floor because the effective cleaning region of the robot cleaner 1 is extended by virtue of the auxiliary cleaning units 100a and 100b outwardly extendable from the body 10.

Although two auxiliary cleaning units 100 are provided at opposite sides of the robot cleaner 1, respectively, in the embodiments of FIGS. 1 to 6, embodiments of the present disclosure are not limited thereto. There is no limitation as to the number of auxiliary cleaning units 100 and the mounting positions of auxiliary cleaning units 100. For convenience of description, the following embodiments will be described in conjunction with the case in which two auxiliary cleaning units 100 are provided at opposite sides of the robot cleaner 1, respectively, as in the embodiments of FIGS. 1 to 6. Also, for convenience of description, the following description will be given only in conjunction with an auxiliary cleaning unit 100 because the two auxiliary cleaning units 100 have the same configuration.

Hereinafter, travel and cleaning operations of the robot cleaner 1 according to the illustrated embodiment performed on the basis of the above-described configuration will be described in detail.

In the following embodiments, it is assumed that cleaning by the main brush unit is basically performed during travel of the robot cleaner.

Although the auxiliary cleaning tool 110, which is applicable to embodiments of the present disclosure, may be implemented in various forms such as a brush and a floorcloth, as described above, the following embodiments will be described in conjunction with the case in which the auxiliary cleaning tool 110 is implemented in the form of a brush, for convenience of description.

Figure 7:
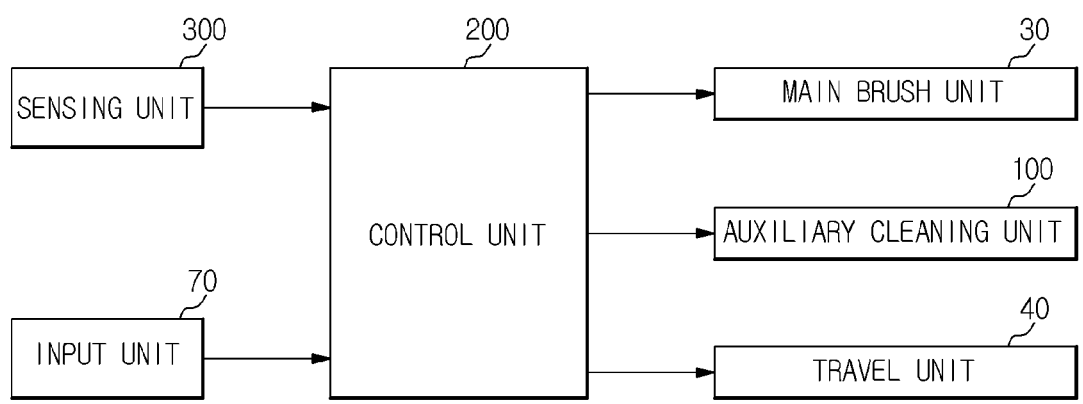
FIG. 7 shows a block diagram of a control configuration of the robot cleaner according to an exemplary embodiment of the present disclosure.

FIG. 7 shows a block diagram of a control configuration of the robot cleaner according to an exemplary embodiment of the present disclosure.

Referring to FIG. 7, in accordance with the illustrated embodiment of the present disclosure, the robot cleaner 1 includes a sensing unit 300 to sense the state of the auxiliary cleaning unit 100 and the surroundings of the robot cleaner 1, an input unit 70 to receive a command from the user in association with travel or cleaning operation of the robot cleaner 1, and a control unit 200 to control the travel and cleaning operation of the robot cleaner 1 in accordance with the sensing result of the sensing unit 300 or the command input to the input unit 70. The main brush unit 30 and auxiliary cleaning unit 100 to perform the cleaning operation of the robot cleaner 1 are also included in the robot cleaner 1. The robot cleaner 1 further includes a travel unit 40 to guide movement of the robot cleaner 1.

The sensing unit 300 senses the surroundings of the robot cleaner 1 such as an obstacle present in a cleaning region and the state of the auxiliary cleaning unit 100. In detail, the sensing unit 300 senses the extension or retraction state of the auxiliary cleaning tool 110 and the rotation state of the auxiliary cleaning tool 110. In order to sense the extension or retraction state of the auxiliary cleaning tool 110, the sensing unit 300 may be implemented by a contact sensor such as a micro switch, an encoder to detect an RPM of the arm motor, a Hall sensor, or the like. In order to sense the rotation state of the auxiliary cleaning tool 110, the sensing unit 300 may be implemented by an encoder to detect an RPM of the rotation motor to drive the auxiliary cleaning tool 110, a Hall sensor, or the like. However, the detecting malfunction of the auxiliary cleaning tool 110 by the sensing unit 300 is not limited thereto. The sensing unit 300 may detect any other malfunctions of the auxiliary cleaning tool 110. For example, the sensing unit 300 may sense the separation of the auxiliary cleaning tool 100 from the side arm or extension arm in order to determine the malfunction of the auxiliary cleaning tool 110.

The input unit 70 receives a command from the user in association with travel or cleaning operation of the robot cleaner 1. Basically, a cleaning start command or a cleaning finish command may be input through on/off input. Also, commands respectively associated with a travel mode and a cleaning mode may be input. The input unit 70 is provided at the body 10 of the robot cleaner 1. The input unit 70 may be implemented in the form of buttons. Alternatively, the input unit 70 may be implemented in the form of a touch panel provided at the display unit 65.

The control unit 200 performs detection of errors occurring in the auxiliary cleaning unit 100, and controls the cleaning and travel operation of the robot cleaner 1, based on the detection result. The control unit 200 includes an error detector 210 to detect errors occurring in the auxiliary cleaning unit 100, a cleaning controller 220 to control the main brush unit 30 and auxiliary cleaning unit 100 for cleaning operation of the robot cleaner 1, and a travel controller 230 to control the travel unit 40 for travel of robot cleaner 100. The configuration and operation of the controller 200 will be described later in detail.

As described above, the main brush unit 30 includes the roller 31, and the main brush 32 installed in the outer surface of the roller 31. As the roller 31 rotates, the main brush 32 sweeps dust accumulated on the floor such that the swept dust is guided to the dust inlet 33. Thus, a main cleaning operation is performed. When the cleaning controller 220 sends a control signal to the drive motor to drive the roller 31, the main brush 32 performs cleaning operation in accordance with the control signal.

The auxiliary cleaning unit 100 performs cleaning of an edge area, for which it is difficult to achieve effective cleaning, using the main brush unit 30. In embodiments of the present disclosure, the edge area may be a portion of the floor contacting an obstacle including a wall. The auxiliary cleaning unit 100 includes the side arm 102 or 106 and/or the extension arm 107, which extends or retracts the auxiliary cleaning tool 110, the rotation motor to rotate the auxiliary cleaning tool 110, and the arm motor to drive the side arm 102 or 106 and/or the extension arm 107.

As described above, the travel unit 40 includes the drive wheels 41 and 42, the caster 43, and the driver to drive the drive wheels 41 and 42. The travel controller 230 sends a control signal to the driver, to forwards or rearwards drive the drive wheels 41 and 42, and thus to move forward or rearward the robot cleaner 1. Meanwhile, during rearward driving of the left drive wheel 41 or 42, it may be possible to turn the robot cleaner 1 to the left when viewed in front of the robot cleaner 1 by driving the right driver wheel 42 or 41 forward. Through driving of the drive wheels 41 and 42 in a reverse manner to the above-described case, it may be possible to turn the robot cleaner 1 to the right when viewed in front of the robot cleaner 1.

Figure 8:
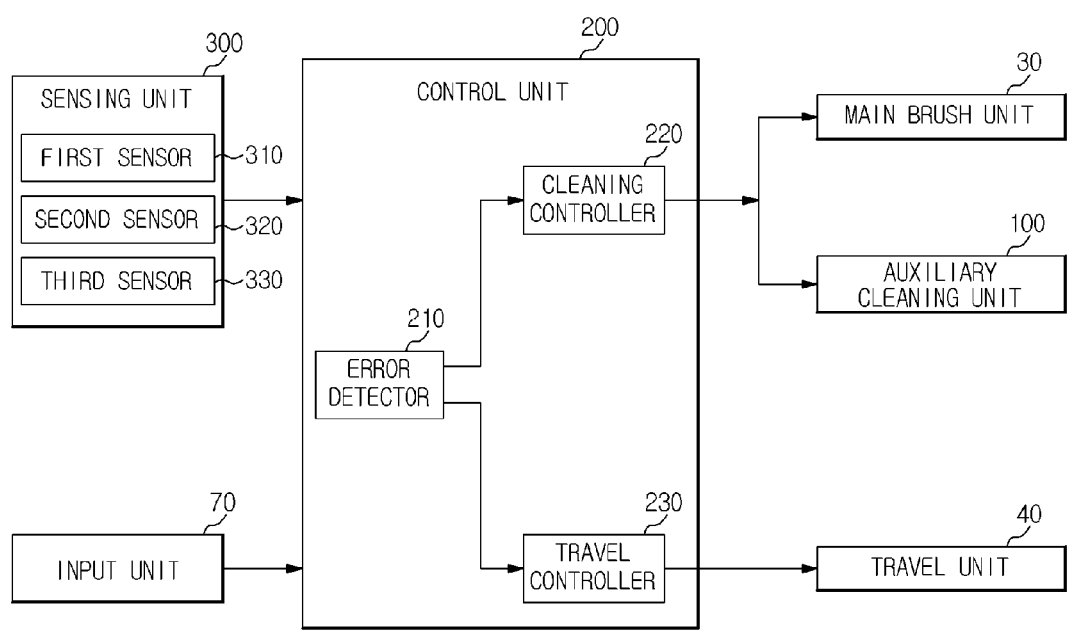
FIG. 8 shows a block diagram illustrating a detailed control configuration of a control unit of the robot cleaner according to an exemplary embodiment of the present disclosure.

FIG. 8 shows a block diagram illustrating a detailed control configuration of the control unit 200 of the robot cleaner according to an exemplary embodiment of the present disclosure.

No further description of the above-described input unit 70, main brush unit 30, auxiliary cleaning unit 100, and travel unit 40 will be given since they are described above.

The sensing unit 300 includes a first sensor 310 to sense an obstacle, a second sensor 320 to sense the surroundings of the cleaning region, and a third sensor 330 to sense the state of the auxiliary cleaning unit 100.

The first sensor 310 may sense an obstacle approaching the robot cleaner 1 during travel of the robot cleaner 1. The sensor 310, which senses an obstacle, may be implemented by an ultrasonic sensor, optical sensor, or proximity sensor. When the first sensor 310 is implemented by an ultrasonic sensor, it may sense an obstacle by emitting an ultrasonic wave over a travel path, and then receiving a reflected ultrasonic wave. When the first sensor 310 is implemented by an optical sensor, it may sense an obstacle by emitting infrared light from an infrared emitter, and then receiving reflected infrared light by an infrared receiver. Also, a proximity sensor, a contact sensor or the like may be used. There is no limitation as to the configuration of the first sensor 310, as long as it senses an obstacle.

For the second sensor 320, a vision sensor may be used, as described above.

The third sensor 330 senses the extension or retraction state of the auxiliary cleaning tool 110. The third sensor 330 may also sense the rotation state of the auxiliary cleaning tool 110. However, the sensing is not limited to the sensing of the extension or retraction state or the rotation state of the auxiliary cleaning tool. The third sensor 330 may detect any other malfunctions of the auxiliary cleaning tool. The extension, retraction and rotation operations of the auxiliary cleaning tool 110 according to the illustrated embodiment of the present disclosure are performed in a manner described with reference to FIGS. 3 to 6. That is, the extension and retraction operations of the auxiliary cleaning tool 110 is performed in accordance with rotation of the arm motor to drive the side arm 102 or extension arm 107. The rotation operation of the auxiliary cleaning tool 110 is performed in accordance with rotation of the rotation motor. The operation of the third sensor 330 to sense the state of the auxiliary cleaning unit 100 will be described in detail with reference to FIGS. 9 and 10.

Figure 9A:
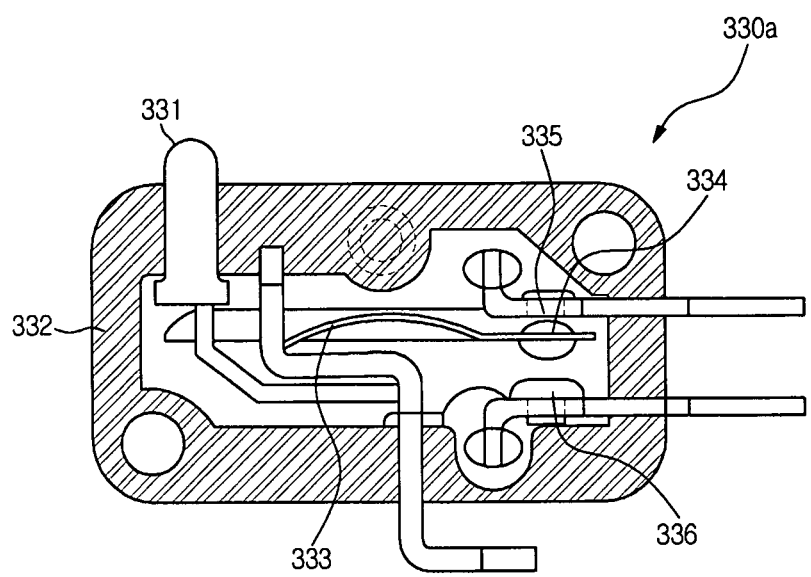
FIGS. 9A and 9B show a sectional view of a micro switch, which is an embodiment of a third sensor.
Figure 9B:
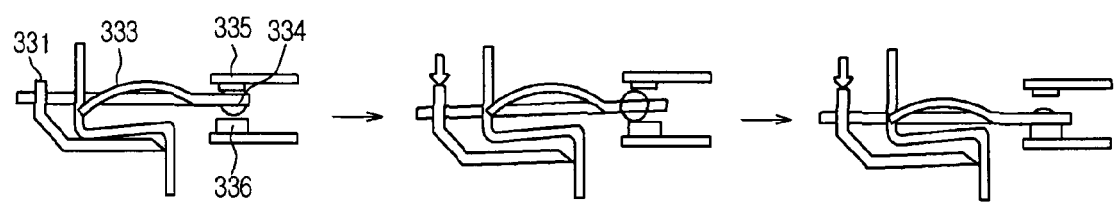

FIGS. 9A and 9B show a sectional view of a micro switch 330a, which is an embodiment of the third sensor 330.

The micro switch 330a is a super-miniature switch capable of opening or closing a relatively large amount of current, using weak force. The micro switch 330a has a structure in which a movable contact is switched between fixed contacts spaced apart from each other by a very small gap in accordance with a function of a snap spring.

Referring to FIG. 9A, the micro switch 330a includes a switch 331 having a miniature structure including a plurality of fixed contacts 335 and 336 spaced apart from each other by a very small gap, a movable contact 334 vertically movable between the fixed contacts 335 and 336, and an actuator. The micro switch 330a also includes a snap spring 333 to move in accordance with an on/off operation of the switch 331, and a case 332 to enclose the above-described elements of the micro switch 330a.

Referring to FIG. 9B, when a pressure higher than the spring force of the snap spring 333 is applied to the snap spring 333 under the condition that the snap spring 333 contacts the upper fixed contact 335, the movable contact 334 is moved to the lower fixed contact 336, so that it contacts the lower fixed contact 336. When the pressure is lowered to a predetermined value, the snap spring 333 is moved upward. Although the time taken for the movable contact 334 to move is within 5 ms and the current capacity of the micro switch 331 is generally 5 A to 30 A, embodiments of the present disclosure are not limited thereto.

When the micro switch 330a is mounted at a predetermined position such that the auxiliary cleaning tool 110 comes into contact with the switch 331 when the auxiliary cleaning tool 110 is completely extended, and the auxiliary cleaning tool 110 does not contact the switch 331 when the auxiliary cleaning tool 110 is retracted, the micro switch 330a is switched on or off in accordance with the extension or retraction of the auxiliary cleaning tool 110. Thus, the micro switch 330a may sense extension or retraction of the auxiliary cleaning tool 110.

Figure 10:
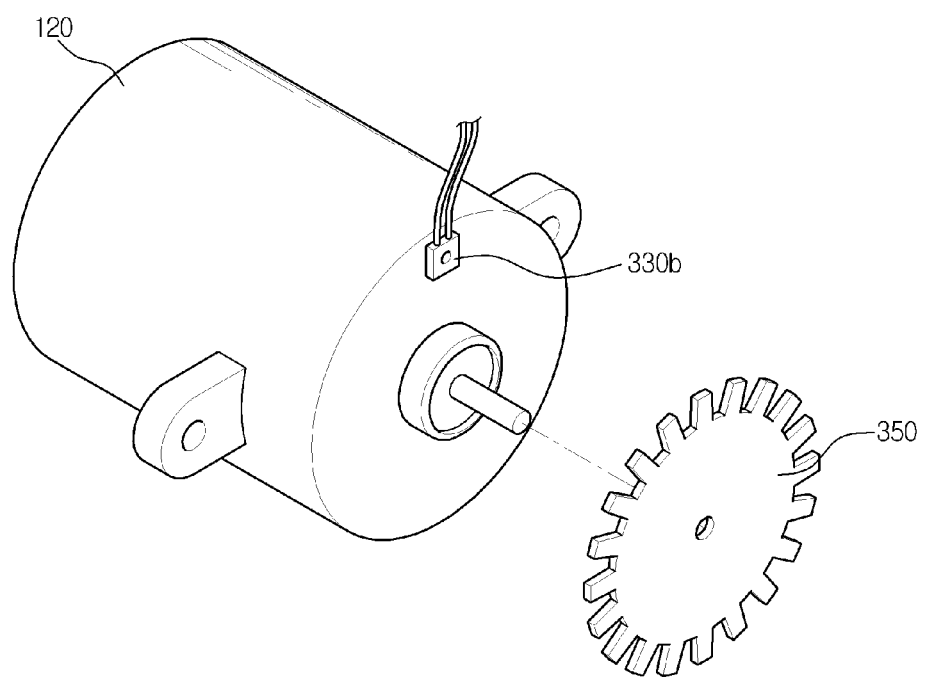
FIG. 10 shows a rotation motor, to which an encoder is mounted as another embodiment of the third sensor.

FIG. 10 shows an encoder 330b is mounted to driver 120 as another embodiment of the third sensor 330.

The auxiliary cleaning unit 100 includes a driver 120, which is constituted by the arm motor to drive the side arm 102 or extension arm 107 and the rotation motor to drive the auxiliary cleaning tool 110. In an embodiment of the present disclosure, the encoder 330b may be mounted to each of the arm motor and rotation motor, or may be mounted to one of the arm motor and rotation motor.

The encoder 330b is a sensor capable of detecting an RPM or rotated position of the associated motor. The encoder 330b includes a light emitter and a light receiver. As shown in FIG. 10, the encoder 330b is mounted to a circumferential surface of the driver 120 at one side of the driver 120. A rotation plate 350 is mounted to a motor shaft of the driver 120. The rotation plate 350 is formed with a plurality of slits in order to allow light to pass through the rotation plate 350 or to prevent light from passing through the rotation plate 350. The encoder 330b is repeatedly turned on/off by the slits of the rotation plate 350, thereby sensing rotation of the motor.

Figure 11:
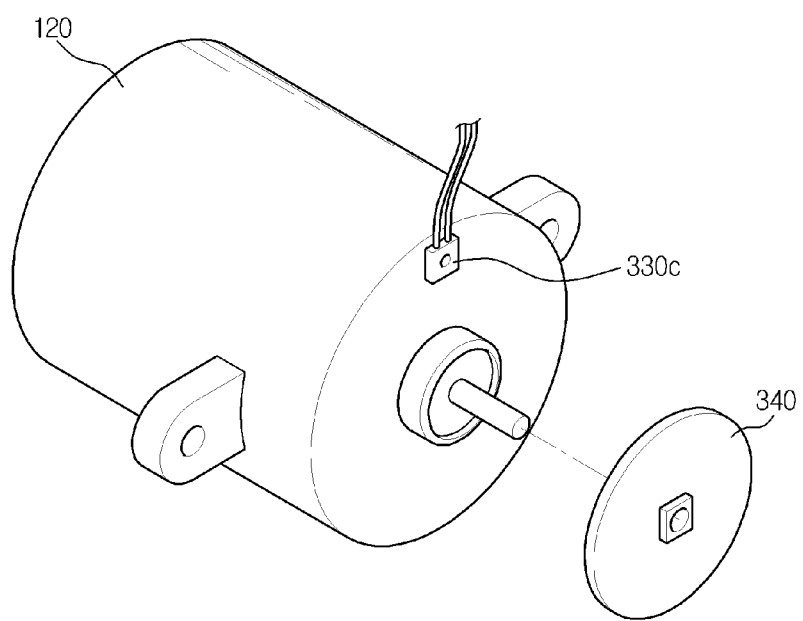
FIG. 11 shows a driver, to which a Hall sensor is mounted as another embodiment of the third sensor.

FIG. 11 shows a Hall sensor 330c is mounted to a driver 120 as another embodiment of the third sensor 330.

A magnet plate 340 is mounted to the motor shaft of the driver 120, which includes an arm motor or a rotation motor. The Hall sensor 330c is mounted to a circumferential surface of the driver 120 at one side of the driver 120, to detect a rotated position of the magnet plate 340, and thus to sense rotation of the driver 120.

The magnet plate 340 may have a structure mounted with a plurality of permanent magnets each having two poles. A plurality of Hall sensors 330c may be installed such that they have a phase difference of 120° or 90°. The Hall sensor 330c may be mounted to each of the arm motor and rotation motor, or may be mounted to one of the arm motor and rotation motor. As shown in FIG. 9A to 11, the sensing unit 300 may include various sensors or the combination of the sensors. For example, in order to sense the extension or retraction state of the auxiliary cleaning tool 110, the micro switch 330a may be used, to sense the rotation state of the auxiliary cleaning tool 110, the encoder 330b or Hall sensor 330c may be used. Further, any combination of the micro switch 330a and the encoder 330b or Hall sensor 330c may be used to detect both the extension or retraction state and the rotation state of the auxiliary cleaning tool 110.

When the driver 120 of FIG. 10 or ills an arm motor to drive the side arm 102 or extension arm 107, it may detect an RPM of the arm motor by the third sensor 330, which is the encoder 330b or Hall sensor 330c. Here, normal rotation of the arm motor may be that the extension and retraction operations of the side arm 102 or extension arm 107, namely, the extension and retraction operations of the auxiliary cleaning tool 110, are normally performed.

When the driver 120 of FIG. 10 or 11 is a rotation motor to drive the auxiliary cleaning tool 110, it may be possible to detect an RPM of the arm motor by the third sensor 330, which is the encoder 330b or Hall sensor 330c. Here, normal rotation of the rotation motor may be that rotation of the auxiliary cleaning tool 110 is normally performed. Operation of detecting an error based on the sensing result of the third sensor 330 will be described later in detail.

Again referring to FIG. 8, the error detector 210 determines, based on the sensing result of the third sensor 330, whether an error has occurred in the auxiliary cleaning unit 100. For example, when the sensing result of the third sensor 330 represents that the auxiliary cleaning tool 110 has not been extended, even though the cleaning controller 220 has transmitted an extension command to the auxiliary cleaning unit 100, the error detector 210 determines that an error has occurred in the auxiliary cleaning unit 100.

Also, when the sensing result of the sensing unit 300 represents that the auxiliary cleaning tool 110 does not normally rotate in accordance with a rotation command from the cleaning controller 220, even though the auxiliary cleaning tool 110 has been normally extended in accordance with the extension command from the cleaning controller 220, it may be determined that an error has occurred.

In detail, when the micro switch 330a is used as the third sensor 330, to sense extension and retraction of the auxiliary cleaning tool 110, it is determined that, if the micro switch 330a has not been switched on in spite of transmission of the extension command from the cleaning controller 220, the auxiliary cleaning tool 110 has not been normally extended.

Also, when the encoder 330b is used as the third sensor 330, to sense extension and retraction of the auxiliary cleaning tool 110, it is determined that, if there is a difference equal to or higher than a predetermined reference value between a pulse width modulation (PWM) signal transmitted from the cleaning controller 220 to the arm motor and an output from the encoder 330b, the auxiliary cleaning tool 110 has not been normally extended.

Also, when the encoder 330b or Hall sensor 330c is additionally used as the third sensor 330, to sense whether the auxiliary cleaning tool 110 normally rotates under the condition that the auxiliary cleaning tool 110 has been normally extended, it may be possible to determine whether the auxiliary cleaning tool 110 normally rotates, through a method of comparing the PWM signal transmitted from the cleaning controller 220 to the rotation motor with an output from the encoder 330b or Hall sensor 330c or comparing the output from the encoder 330b or Hall sensor 330c with a predetermined reference waveform. However, the sensing is not limited to the sensing of the extension or retraction state or the rotation state of the auxiliary cleaning tool. The third sensor 330 may detect any other malfunctions of the auxiliary cleaning tool.

As described with reference to FIGS. 1 to 6, the robot cleaner 1 according to the illustrated embodiment of the present disclosure includes a plurality of auxiliary cleaning units 100a and 100b installed at the front portion of the robot cleaner 1 at opposite sides of the robot cleaner 1. In this regard, error detection may be performed for each of the left auxiliary cleaning unit 100b and right auxiliary cleaning unit 100a.

Embodiments of the present disclosure are not limited to the above-described case. There is no limitation as to the number and positions of auxiliary cleaning units 100. An appropriate number and appropriate positions of auxiliary cleaning units 100 may be applied in order to effectively clean an area, for which it is difficult to achieve effective cleaning, using the main brush unit 30. Of course, for convenience of description, the following embodiments will be described in conjunction with the case in which two auxiliary cleaning units 100 are provided at opposite sides of the robot cleaner 1, respectively. Also, for convenience of description, the following description will be given only in conjunction with one auxiliary cleaning unit 100 because the two auxiliary cleaning units 100 have the same configuration.

In accordance with an embodiment of the present disclosure, the robot cleaner 1 may repeat the above procedure a predetermined number of times in order to achieve more accurate error detection. For example, it is assumed that the robot cleaner 1 is set to repeat the above procedure 4 times. In this case, when the sensing result of the third sensor 330 represents that the auxiliary cleaning tool 110 has not been normally extended, even though the cleaning controller 220 has transmitted an extension command to the auxiliary cleaning unit 100, the cleaning controller 220 again transmits the extension command to the auxiliary cleaning unit 100. If the auxiliary cleaning tool 110 has not been normally extended in spite of 4-time repetition of the above-described procedure, it is determined that an error has occurred in the auxiliary cleaning unit 100. On the other hand, when the auxiliary cleaning tool 110 is normally extended before 4-time repetition of the above-described procedure, error detection is stopped, and then desired cleaning and travel are begun.

The cleaning controller 220 controls the main brush unit 30 and auxiliary cleaning unit 100, based on the sensing result of the sensing unit 300, the detection result of the error detector 210, or a user command input through the input unit 70. In detail, the cleaning controller 220 generates a PWM signal corresponding to a desired operation, and then transmits the PWM signal to various motors to drive the brush unit 30 and auxiliary cleaning unit 100, to control operations of the main brush unit 30 and auxiliary cleaning unit 100.

Similarly, the travel controller 230 controls the travel unit 40, based on the sensing result of the sensing unit 300, the detection result of the error detector 210, or a user command input through the input unit 70, to control the travel path and travel speed of the robot cleaner 1.

Hereinafter, operation of the travel controller 230 to control travel of the robot cleaner 1, based on the detection result of the error detector 210, will be described.

In accordance with an embodiment of the present disclosure, when the robot cleaner 1 determines, based on the detection result of the error detector 210, that the auxiliary cleaning unit 100 does not normally operate, it executes appropriate travel control meeting the current travel mode in order to achieve efficient cleaning without the auxiliary cleaning unit 100. In detail, when there is an error in one of the right and left auxiliary cleaning units 100a and 100b, travel of the robot cleaner 1 is controlled such that the other auxiliary cleaning unit, in which there is no error, is disposed adjacent to a wall or an edge area.

Hereinafter, detailed travel control will be described with reference to FIGS. 12 to 17.

Figure 12:
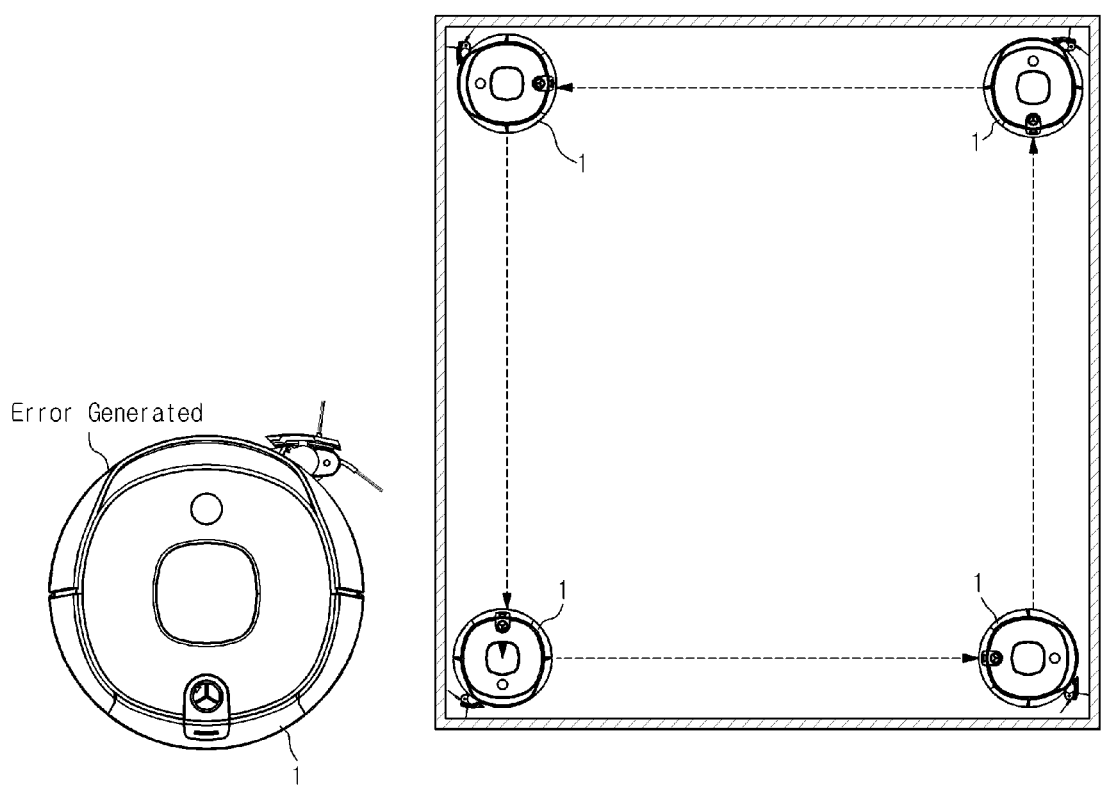
FIGS. 12 and 13 are views illustrating wall tracing travel controlled when an error occurs in one of the left and right auxiliary cleaning units.
Figure 13:
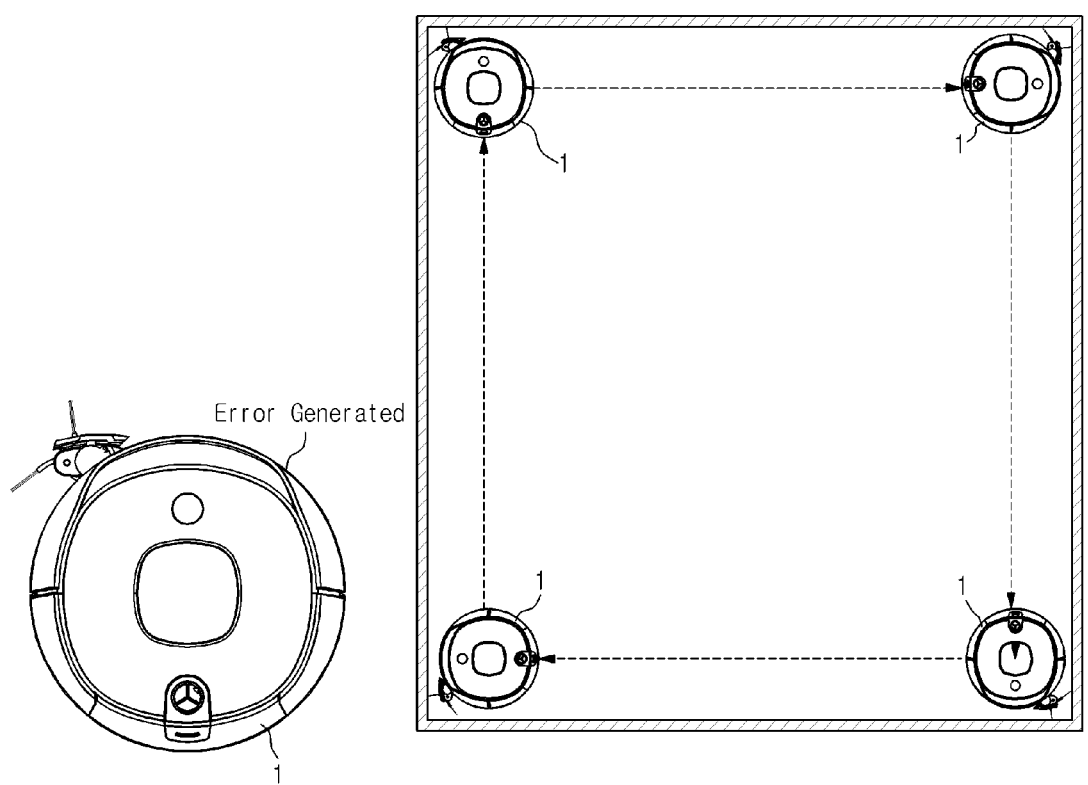

FIGS. 12 and 13 are views illustrating wall tracing travel controlled when an error occurs in one of the left and right auxiliary cleaning units 100.

When the error detector 210 detects occurrence of an error in one of the auxiliary cleaning units 100 under the condition that, for wall tracing travel, an extension command has been transmitted to the auxiliary cleaning units 100, the travel controller 230 controls the travel unit 40 such that the other auxiliary cleaning unit 100, in which there is no error, travels along an area adjacent to a wall.

For reference, the front, rear, left and right sides of a cleaning region, which will be described in the following embodiments, are defined when the cleaning region is downwardly viewed from the top side.

Referring to FIG. 12, when an error occurs in the left auxiliary cleaning unit 100b under the condition that there is no error in the right auxiliary cleaning unit 100a, wall tracing travel is performed in a counterclockwise direction such that the right auxiliary cleaning unit 100a travels along an area adjacent to the wall.

Referring to FIG. 13, when an error occurs in the right auxiliary cleaning unit 100a under the condition that there is no error in the left auxiliary cleaning unit 100b, wall tracing travel is performed in a clockwise direction such that the left auxiliary cleaning unit 100b travels along the area adjacent to the wall.

When the auxiliary cleaning unit 100, which is not extended or does not normally rotate in an extended state, due to occurrence of errors, travels along the area adjacent to the wall, cleaning of an edge area of the floor contacting the wall is ineffectively performed. In this case, accordingly, the efficiency of cleaning is degraded. However, when travel of the robot cleaner 1 is controlled such that one auxiliary cleaning unit, which operates normally, as shown in FIG. 12 or 13, travels along the area adjacent to the wall, it may be possible to achieve efficient cleaning through wall tracing travel even when there is an error in the other auxiliary cleaning unit.

Figure 14:
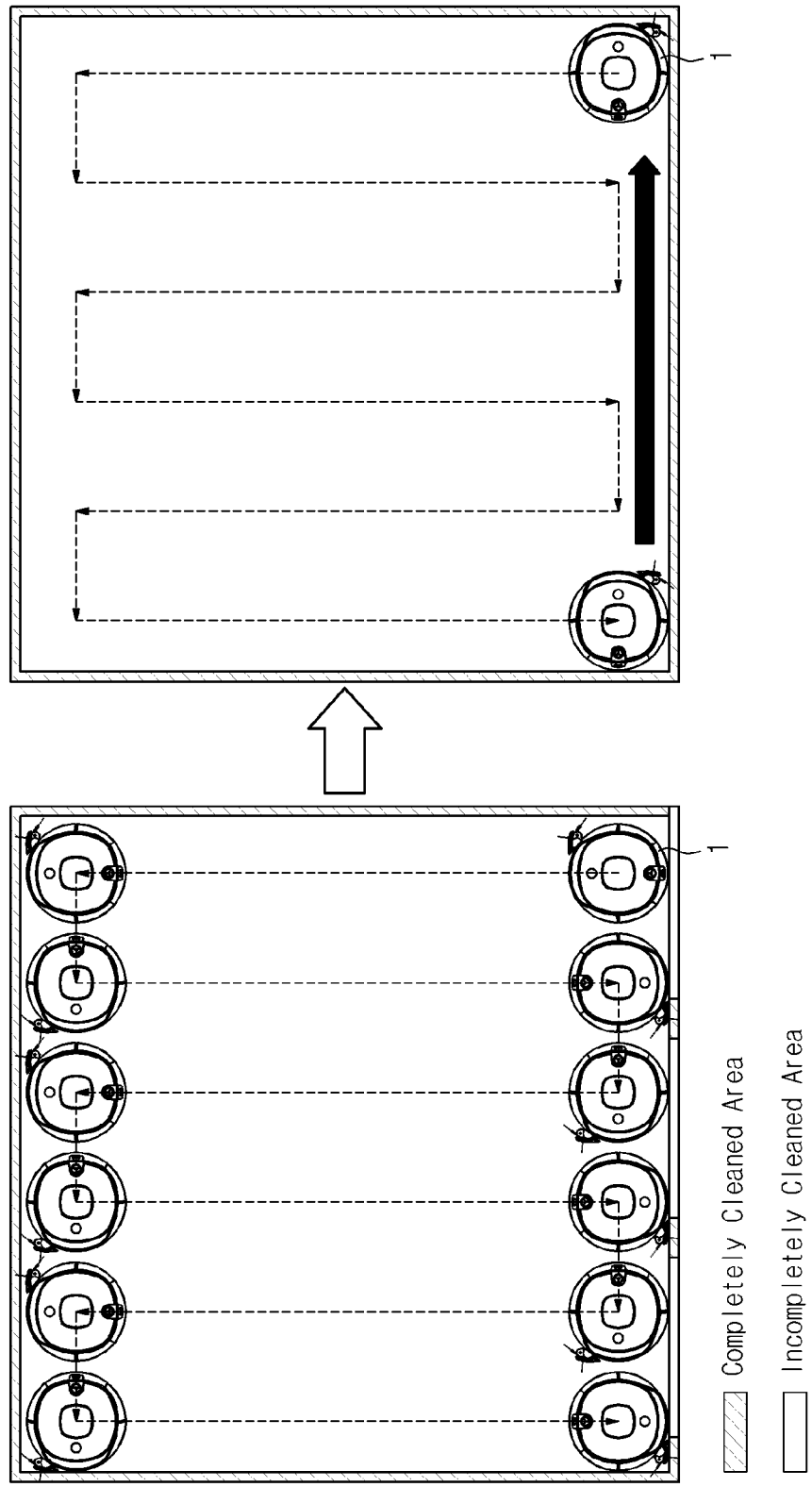
FIGS. 14 and 15 are views illustrating zigzag travel controlled when an error occurs in one of the left and right auxiliary cleaning units.
Figure 15:
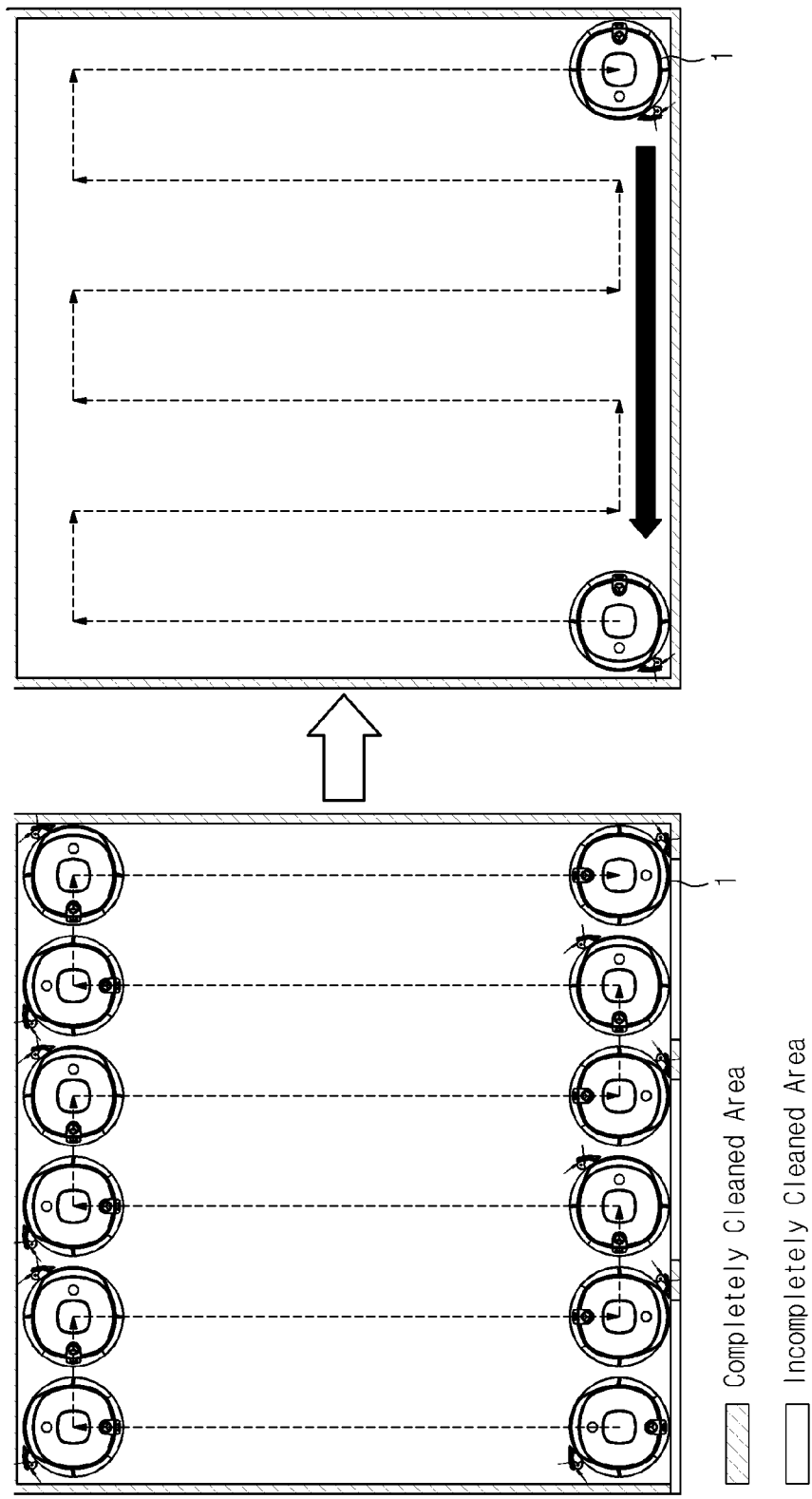

FIGS. 14 and 15 are views illustrating zigzag travel controlled when an error occurs in one of the left and right auxiliary cleaning units 100.

Referring to FIG. 14, when an error occurs in the left auxiliary cleaning unit 100b under the condition that there is no error in the right auxiliary cleaning unit 100a, zigzag travel is performed. That is, wall tracing travel in a direction from a rear side to a front side and wall tracing travel in a direction from the front side to the rear side, are alternately performed, starting from a right side. If such zigzag travel is performed, starting from a left side, under the condition that there is an error in the left auxiliary cleaning unit 100b, cleaning of a left edge area is ineffectively achieved.

When zigzag travel is completed after starting from the right side, there is a region, for which cleaning has been ineffectively achieved, at the front side, as shown in FIG. 14, because the normal auxiliary cleaning unit may not come into contact with the unclean region. Accordingly, after completion of the zigzag travel, wall tracing travel is performed for the front wall in a direction from the left side to the right side in order to completely achieve cleaning even for the incompletely-cleaned area.

Referring to FIG. 15, when an error occurs in the right auxiliary cleaning unit 100a under the condition that there is no error in the left auxiliary cleaning unit 100b, zigzag travel is performed in an opposite manner to that of FIG. 14. That is, wall tracing travel in a direction from the front side to the rear side and wall tracing travel in a direction from the rear side to the front side are alternately performed, starting from the left side. For a region, for which cleaning has been ineffectively achieved, at the front side, because the normal auxiliary cleaning unit cannot come into contact with the region, wall tracing travel is performed for the front wall in a direction from the right side to the left side in order to completely achieve cleaning even for the incompletely-cleaned area.

Figure 16:
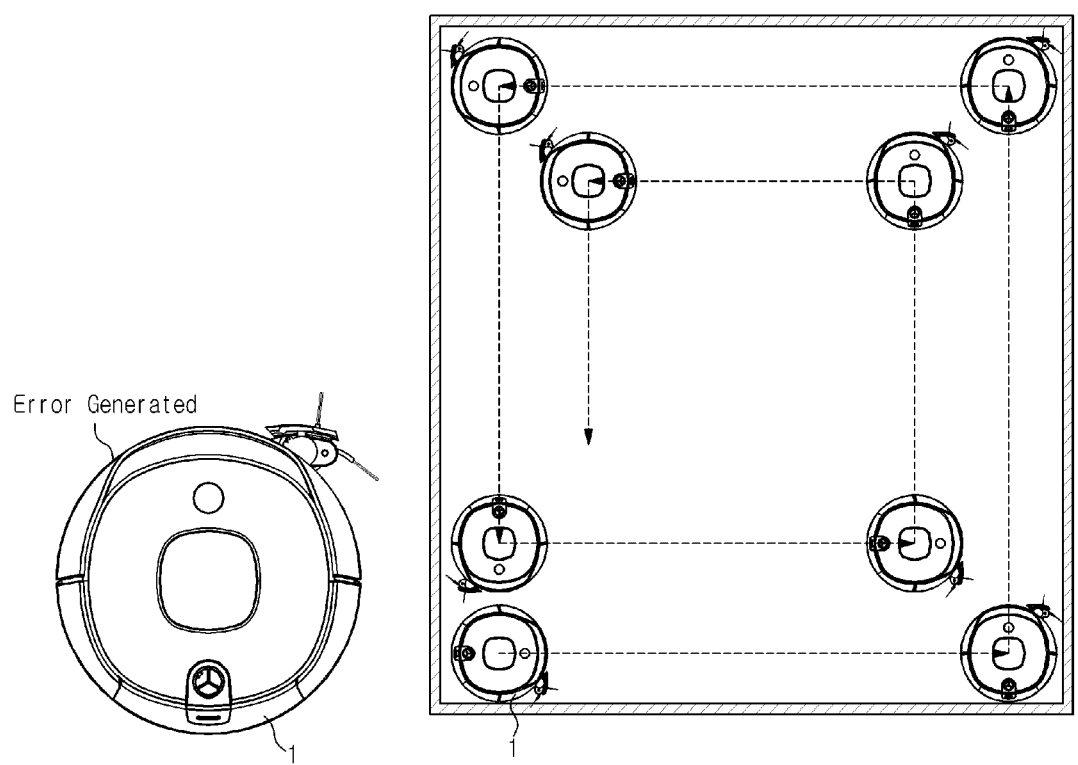
FIGS. 16 and 17 are views illustrating spiral travel controlled when an error occurs in one of the left and right auxiliary cleaning units.
Figure 17:
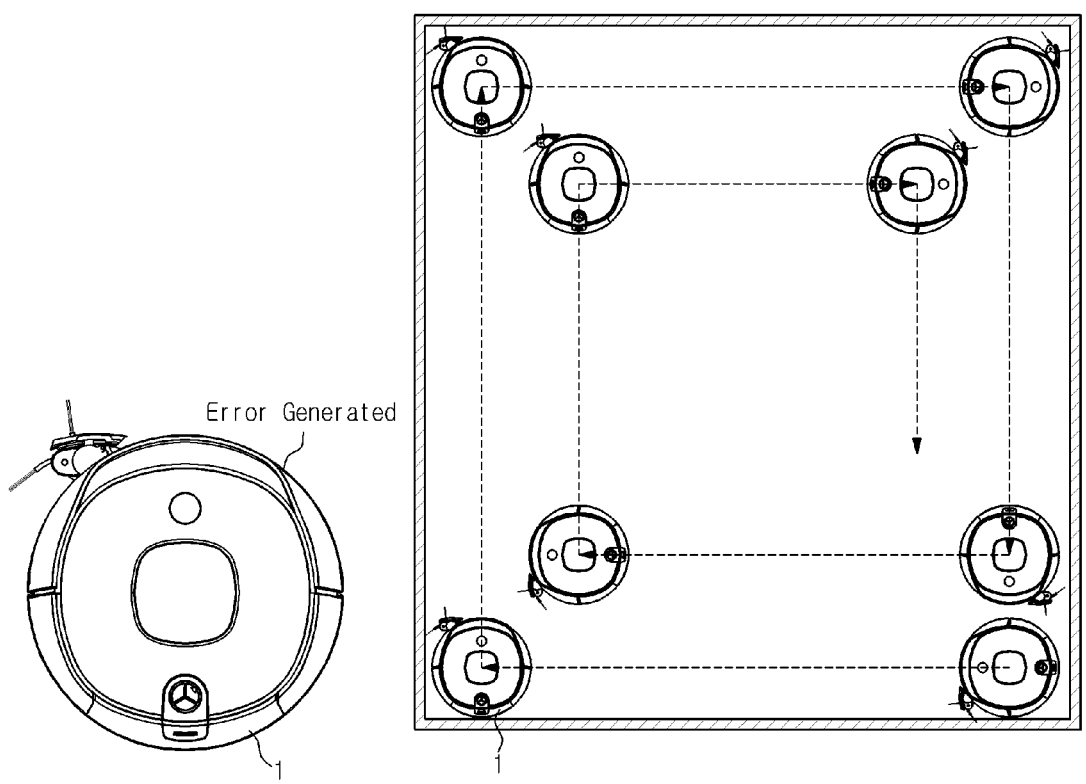

FIGS. 16 and 17 are views illustrating spiral travel controlled when an error occurs in one of the left and right auxiliary cleaning units 100.

As shown in FIGS. 16 and 17, spiral travel is performed such that the robot cleaner 1 continuously travels about the cleaning region in a spiral manner such that the travel radius thereof is gradually reduced. This spiral travel is a travel mode capable of achieving fine cleaning of the cleaning region. Even in the spiral travel, however, cleaning of an edge area adjacent to a wall may be ineffectively performed when the auxiliary cleaning unit, in which there is an error, travels along the edge area.

Referring to FIG. 16, when an error occurs in the left auxiliary cleaning unit 100b under the condition that the right auxiliary cleaning unit 100a operates normally, the robot cleaner 1 performs spiral travel in a counterclockwise direction such that the right auxiliary cleaning unit 100a travels along an area adjacent to a wall.

When the robot cleaner 1, in which the right auxiliary cleaning unit 100a travels along the area adjacent to the wall, performs spiral travel in the counterclockwise direction, cleaning of the edge areas in the cleaning region is effectively completed, as shown in FIG. 16.

Referring to FIG. 17, when an error occurs in the right auxiliary cleaning unit 100a under the condition that the left auxiliary cleaning unit 100b operates normally, the robot cleaner 1 performs spiral travel in an opposite direction to that of FIG. 16, namely, in a clockwise direction, such that the left auxiliary cleaning unit 100b travels along an area adjacent to a wall.

When the robot cleaner 1, in which the left auxiliary cleaning unit 100b travels along the area adjacent to the wall, performs spiral travel in the clockwise direction, cleaning of the edge areas in the cleaning region is effectively completed, as shown in FIG. 17.

The above-described embodiments are associated with the case in which one of the auxiliary cleaning units 100a and 100b operates normally, and there is an error in the other auxiliary cleaning unit. When an error occurs in both the right and left auxiliary cleaning units 100a and 100b, travel control is executed such that originally-intended travel is performed. When both the right and left auxiliary cleaning units are malfunctioned, the controller periodically checks states of the auxiliary cleaning units 100. If it is detected that one of the auxiliary cleaning units 100a or 100b become operating normally, then the control unit may control the travel of the robot cleaner in the same manner when the auxiliary cleaning unit is operated as shown in above embodiments of the present disclosure. For example, the control unit may control the travel of the robot cleaner such that the normally operating auxiliary cleaning unit to travel along an area adjacent to a wall.

The travel control shown in FIGS. 12 to 17 is only as an example. Travel control may be achieved in various manners in accordance with various embodiments of the present disclosure, as long as travel of the robot cleaner is controlled, based on error detection for the auxiliary cleaning units 100, such that the auxiliary cleaning unit, in which no error occurs, travels along a region adjacent to the edge area to clean.

In accordance with another embodiment of the present disclosure, when there is an error in the auxiliary cleaning units 100, the cleaning controller 220 may perform travel control such that originally-intended travel is performed under the condition that the auxiliary cleaning tools 110 are not extended. When the auxiliary cleaning tools 110 do not rotate in an extended state, they may be retracted. Also, when there is an error in one of the two auxiliary cleaning tools 110, both the auxiliary cleaning tools 110 may be controlled such that they are not extended. The user may input, through the input unit 70, a drive command to retract the auxiliary cleaning tools 110.

In accordance with an embodiment of the present disclosure, the robot cleaner 1 periodically checks states of the auxiliary cleaning units 100 after it is determined that there is an error in at least one of the auxiliary cleaning units 100. When the auxiliary cleaning units 100 operate normally, the current travel mode is returned to an original travel mode.

The error detector 210 of the controller 200 repeatedly executes error detection operation at predetermined intervals after detecting an error in one of the auxiliary cleaning unit 100. When it is determined, based on the detection result, that the auxiliary cleaning unit 100 in which an error has been detected again operates normally, the current travel mode may be returned to the original travel mode.

In accordance with an embodiment of the present disclosure, the robot cleaner 1 may further have a function to inform the user of occurrence of an error when the error occurs in at least one of the auxiliary cleaning units 100. The error occurrence may be visibly displayed on the display unit 65 or may be audibly indicated through output of sound.

Hereinafter, a control method for the robot cleaner according to an exemplary embodiment of the present disclosure will be described.

Figure 18:
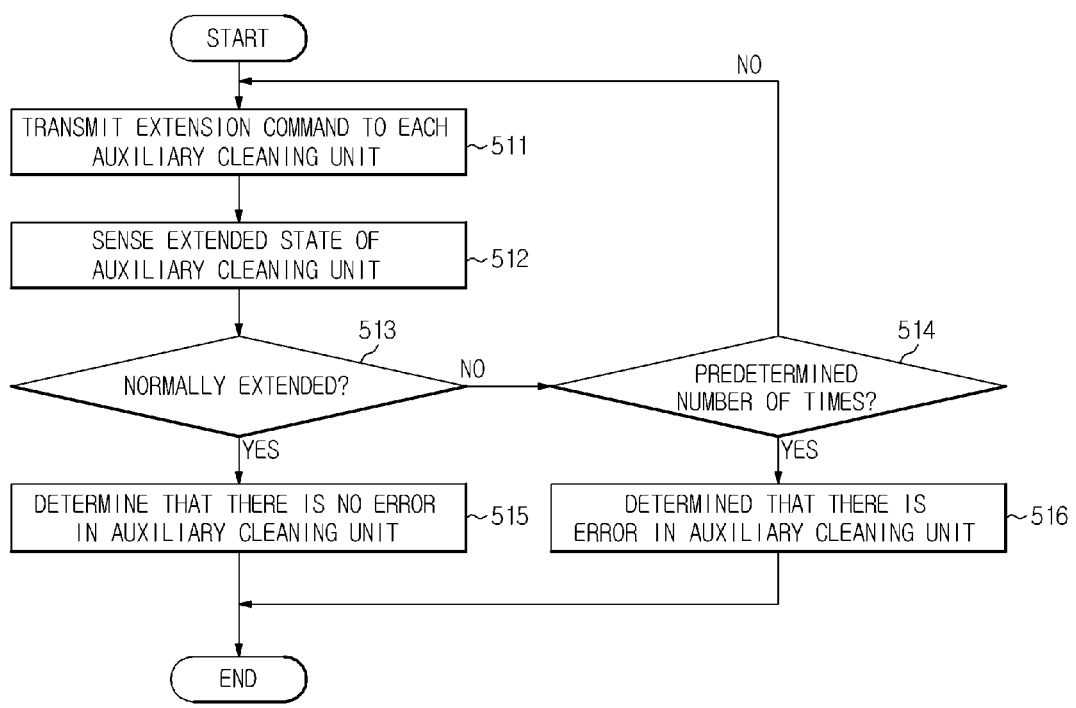
FIG. 18 shows a flowchart illustrating a procedure of detecting whether an error has occurred in the auxiliary cleaning units of the robot cleaner in accordance with an embodiment of the present disclosure.

FIG. 18 shows a flowchart illustrating a procedure of detecting whether an error about extension and retraction has occurred in the auxiliary cleaning units 100 of the robot cleaner in accordance with an embodiment of the present disclosure.

Referring to FIG. 18, the cleaning controller 220 first transmits an extension command to each auxiliary cleaning unit 100, for a predetermined cleaning operation (511). As described above, the extension command for each auxiliary cleaning unit 110 may be a PWM signal for the associated arm motor.

The third sensor 330 then senses an extended state of each auxiliary cleaning tool 110 (512). Sensing the extended state of the auxiliary cleaning tool 110 may include determining whether the auxiliary cleaning tool 110 contacts the micro switch 330a, based on an on/off state of the micro switch 330a, or determining whether there is a difference between an output signal from the encoder 330b or Hall sensor 330c mounted to the arm motor and a PWM signal transmitted from the cleaning controller 220 to the arm motor, based on the result of comparison of the signals.

When the sensing result represents that the auxiliary cleaning tool 110 has not been normally extended ("NO" in 513), it may be determined that there is an error in the auxiliary cleaning unit 100. Of course, the above operations may be repeated predetermined number of times in accordance with an embodiment of the present disclosure, in order to achieve more accurate error detection.

Thus, when the auxiliary cleaning tool 110 has not been normally extended, transmission of the extension command and determination as to whether the auxiliary cleaning tool 110 is normally extended are repeated. When the number of repetition times corresponds to the predetermined number of times ("YES" in 514), it is determined that there is an error in the auxiliary cleaning unit 100 (516).

When the auxiliary cleaning tool 110 has been normally extended ("YES" in 513), it is determined that there is no error in the auxiliary cleaning unit 100 (515).

As described above, the control method for the robot cleaner according to the illustrated embodiment of the present disclosure is executed for each of the right and left auxiliary cleaning units 100a and 100b.

Although determination as to whether there is an error is executed only in association with the extension operation of each auxiliary cleaning tool 110, in the control method of FIG. 18, it may be determined that there is an error, when the auxiliary cleaning tool 110 does not normally rotate, even though the auxiliary cleaning tool 110 is in a normally-extended state. Whether the auxiliary cleaning tool 110 rotates normally may be determined through comparison between the PWM signal transmitted to the rotation motor and the output signal from the encoder 330b or Hall sensor 330c mounted to the rotation motor, as described above.

Figure 19:
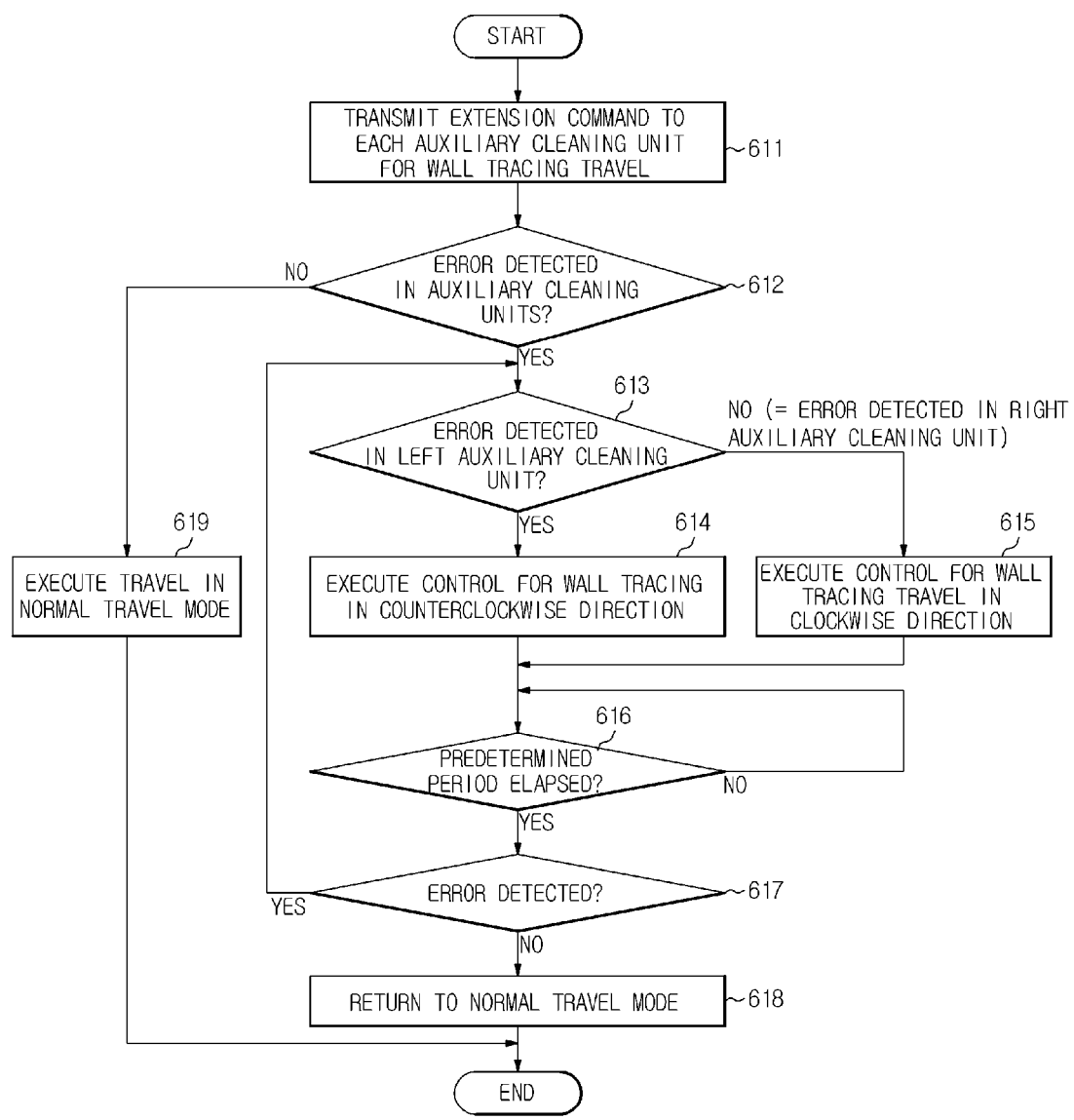
FIG. 19 shows a flowchart illustrating a control method for the robot cleaner when there is an error in at least one of the auxiliary cleaning units during wall tracing travel.

FIG. 19 shows a flowchart illustrating a control method for the robot cleaner when there is an error in at least one of the auxiliary cleaning units 100 during wall tracing travel.

Referring to FIG. 19, an extension command is transmitted to the auxiliary cleaning units 100, for wall tracing travel (611). An error detection procedure is then executed in the same manner as in FIG. 18.

Through the procedure of FIG. 18, it is detected whether an error has occurred in the auxiliary cleaning units 100 (612). When an error is detected in one of the auxiliary cleaning units 100 ("YES" in 612) and the erroneous auxiliary cleaning unit is the left auxiliary cleaning unit 100b ("YES" in 613), the robot cleaner 1 is controlled to trace walls in a counterclockwise direction such that the right auxiliary cleaning unit 100a travels along an area adjacent to the walls (614).

When there is no error detected in the auxiliary cleaning units 100 ("NO" in 612), the robot cleaner 1 is controlled to travel in a normal travel mode (619). Here, the normal travel mode may be a travel mode originally intended to be executed by the robot cleaner 1.

On the other hand, when the erroneous auxiliary cleaning unit is the right auxiliary cleaning unit 100a ("NO" in 613), the robot cleaner 1 is controlled to trace walls in a clockwise direction such that the left auxiliary cleaning unit 100b travels along an area adjacent to the walls (615).

Although in this embodiment, the error in the left auxiliary cleaning is detected first, the order of detecting the auxiliary cleaning units is not limited thereto. The errors in the auxiliary cleaning units may be detected in any order or may be simultaneously detected for the auxiliary cleaning units. For example, the error in the right auxiliary cleaning unit may be detected first or the errors in the left and right auxiliary cleaning units may be simultaneously detected.

Although it is not shown in the drawing, when there is an error in both the right and left auxiliary cleaning units 100a and 100b, the robot cleaner 1 is controlled to travel in a normal travel mode and the controller periodically checks states of the auxiliary cleaning units 100a and 100b. If it is detected that one of the auxiliary cleaning units 100a or 100b become operating normally, then the control unit may control the travel of the robot cleaner as shown in operations 614 or 615.

After a predetermined period elapses (616), error detection for the auxiliary cleaning units 100 is again executed (617). When it is determined that there is no error in each auxiliary cleaning tool 110, in that the auxiliary cleaning tool 110 is in a normally-extended state, the travel mode of the robot cleaner 1 is returned to the normal travel mode (618).

Figure 20:
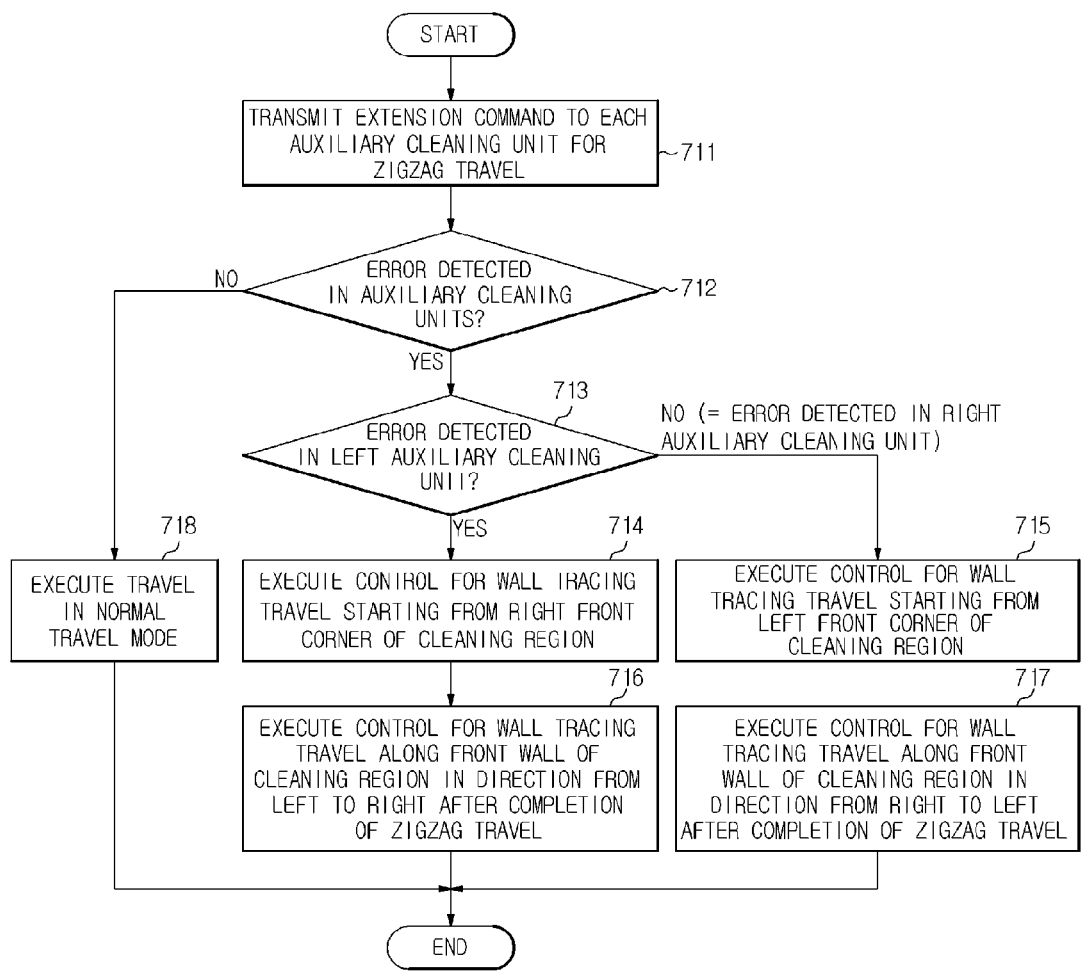
FIG. 20 shows a flowchart illustrating a control method for the robot cleaner when there is an error in at least one of the auxiliary cleaning units during zigzag travel.

FIG. 20 shows a flowchart illustrating a control method for the robot cleaner 1 when there is an error in at least one of the auxiliary cleaning units 100 during zigzag travel.

Referring to FIG. 20, an extension command is transmitted to the auxiliary cleaning units 100, for zigzag travel (711). Through the procedure of FIG. 18, it is detected whether an error has occurred in the auxiliary cleaning units 100 (712). When there is no error detected in the auxiliary cleaning units 100 ("NO" in 712), the robot cleaner 1 is controlled to travel in a normal travel mode (718). When an error is detected in one of the auxiliary cleaning units 100 ("YES" in 712) and the auxiliary cleaning unit having an error is the left auxiliary cleaning unit 100b ("YES" in 713), the robot cleaner 1 is controlled to execute wall tracing travel, starting from a right front corner of the cleaning region such that cleaning is completed for the cleaning region, except for an edge area adjacent to the front wall of the cleaning region (714).

After completion of zigzag travel, the robot cleaner 1 is controlled to execute wall tracing travel along the front wall of the cleaning region in a direction from the left to the right in order to achieve cleaning of the incompletely-cleaned area (716).

On the other hand, when the erroneous auxiliary cleaning unit is the right auxiliary cleaning unit 100a ("NO" in 713), the robot cleaner 1 is controlled to execute wall tracing travel, starting from a left front corner of the cleaning region (715). After completion of zigzag travel, the robot cleaner 1 is controlled to execute wall tracing travel along the front wall of the cleaning region in a direction from the right to the left in order to achieve cleaning of an incompletely-cleaned area (717).

Although in this embodiment, the error in the left auxiliary cleaning is detected first, the order of detecting the auxiliary cleaning units is not limited thereto. The errors in the auxiliary cleaning units may be detected in any order or may be simultaneously detected for the auxiliary cleaning units. For example, the error in the right auxiliary cleaning unit may be detected first or the errors in the left and right auxiliary cleaning units may be simultaneously detected.

Figure 21:
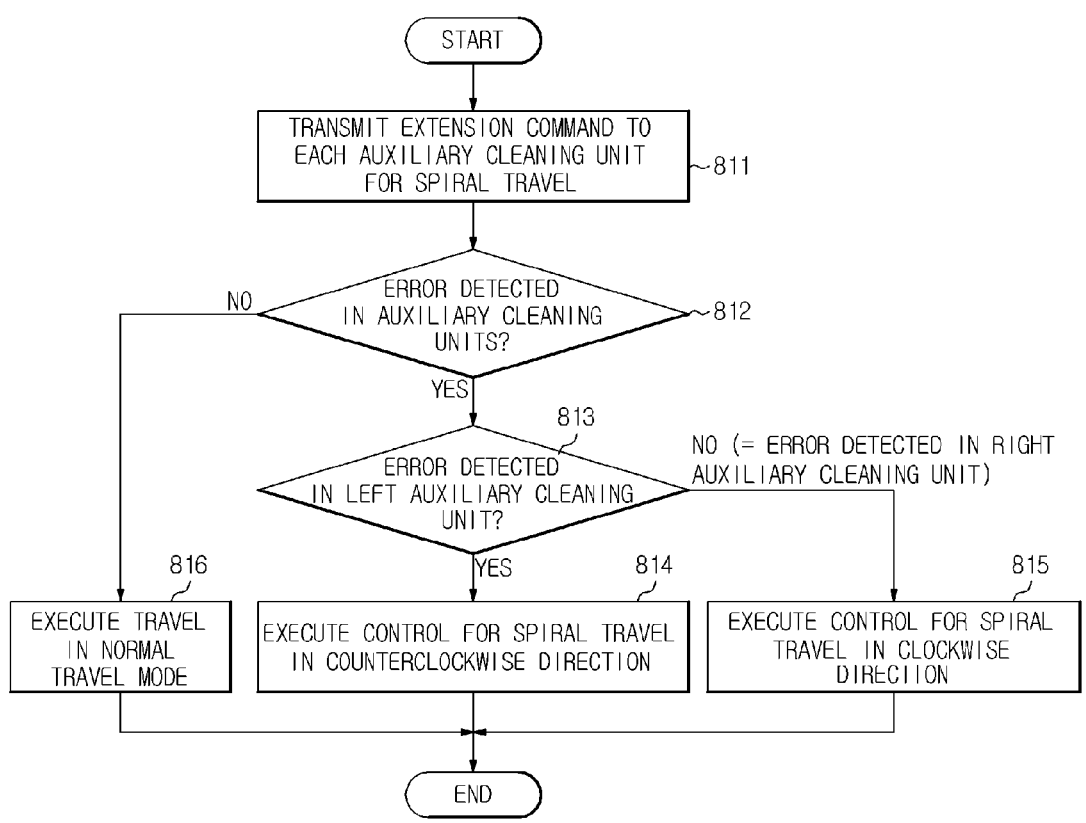
FIG. 21 shows a flowchart illustrating a control method for the robot cleaner when there is an error in at least one of the auxiliary cleaning units during spiral travel.

FIG. 21 shows a flowchart illustrating a control method for the robot cleaner 1 when there is an error in at least one of the auxiliary cleaning units 100 during spiral travel.

Referring to FIG. 21, an extension command is transmitted to the auxiliary cleaning units 100, for spiral travel (811).

Through the procedure of FIG. 18, it is detected whether an error has occurred in the auxiliary cleaning units 100 (812). When an error is detected in one of the auxiliary cleaning units 100 ("YES" in 812), and the erroneous auxiliary cleaning unit is the left auxiliary cleaning unit 100b ("YES" in 813), the robot cleaner 1 is controlled to execute spiral travel in a counterclockwise direction (814).

When there is no error detected in the auxiliary cleaning units 100 ("NO" in 812), the robot cleaner 1 is controlled to travel in a normal travel mode (816). Here, the normal travel mode may be a travel mode originally intended to be executed by the robot cleaner 1.

On the other hand, when the erroneous auxiliary cleaning unit is the right auxiliary cleaning unit 100a ("NO" in 813), the robot cleaner 1 is controlled to execute spiral travel in a clockwise direction (815).

Although in this embodiment, the error in the left auxiliary cleaning is detected first, the order of detecting the auxiliary cleaning units is not limited thereto. The errors in the auxiliary cleaning units may be detected in any order or may be simultaneously detected for the auxiliary cleaning units. For example, the error in the right auxiliary cleaning unit may be detected first or the errors in the left and right auxiliary cleaning units may be simultaneously detected.

In accordance with the above control method, it may be possible to completely achieve cleaning of a peripheral portion of the cleaning region, namely, edge areas adjacent to the walls of the cleaning region, while executing spiral travel.

Although not shown in FIGS. 20 and 21, error detection is repeated at predetermined intervals, even in the cases of zigzag travel and spiral travel, similarly to the case of wall tracking travel described with reference to FIG. 19, such that the current travel mode may be returned to the original travel mode when the error-detected auxiliary cleaning unit again operates normally.

Although the auxiliary cleaning tools 110 are implemented in the form of a brush in the above-described embodiments, there is no limitation as to the kind and cleaning type of the auxiliary cleaning tools 110 and, as such, various embodiments may be applicable to the auxiliary cleaning tools 110.

In a robot cleaner and a control method for the same according to one aspect of the present disclosure, it may be possible to achieve efficient cleaning of edge areas, even when there is an error in an auxiliary cleaning unit by detecting an error in the auxiliary cleaning unit, and controlling travel of the robot cleaner, based on the detection result.

Also, it may be possible to achieve appropriate cleaning meeting original desire of the user by taking the current travel state into consideration in controlling travel of the robot cleaner based on the error detection result for the auxiliary cleaning unit.

In addition, error detection is repeated at predetermined intervals when there is an error detected in the auxiliary cleaning unit, such that the current travel mode may be returned to the original travel mode when the error-detected auxiliary cleaning unit again operates normally. Thus, it may be possible to cope with a state change of the auxiliary cleaning unit.

Although a few embodiments of the present disclosure have been shown and described it would be appreciated by those skilled in the art that changes may be made in these embodiments without departing from the principles and spirit of the disclosure, the scope of which is defined in the claims and their equivalents.

What is claimed is:

1. A robot cleaner comprising:
   auxiliary cleaning units mounted to the robot cleaner, the auxiliary cleaning units being extendable and retractable from the robot cleaner to remove foreign matter from a floor while the robot cleaner travels on the floor to clean a cleaning region;
   a sensing unit to sense operation states of the auxiliary cleaning units, respectively; and
   a control unit to determine whether the auxiliary cleaning units operate normally based on the operation states sensed by the sensing unit, and, when one of the auxiliary cleaning units is not operating normally while another one of the auxiliary cleaning units is operating normally, to control travel of the robot cleaner so that the another one of the auxiliary cleaning units cleans an area adjacent to an edge portion of the cleaning region.

2. The robot cleaner according to claim 1, wherein the operation states include at least one of extension, retraction and rotation states of the auxiliary cleaning units.

3. The robot cleaner according to claim 2, wherein the sensing unit comprises at least one of a contact sensor, with which each of the auxiliary cleaning units comes into contact in an extended state, an encoder mounted to a driver which drives each of the auxiliary cleaning units, and a Hall sensor mounted to the driver, the sensing unit senses the extension and retraction state of each of the auxiliary cleaning units.

4. The robot cleaner according to claim 2, wherein the sensing unit comprises at least one of an encoder mounted to a driver which drives the rotation of each of the auxiliary cleaning units, and a Hall sensor mounted to the driver, the sensing unit senses the rotation state of each of the auxiliary cleaning units.

5. The robot cleaner according to claim 2, wherein the sensing unit comprises at least one of a contact sensor, an encoder and a Hall sensor, to sense at least one of the extension, retraction and rotation state of each of the auxiliary cleaning units.

6. The robot cleaner according to claim 1, wherein the control unit transmits a command to operate the auxiliary cleaning units, and determines whether the auxiliary cleaning units operate in accordance with the transmitted command based on the operation states sensed by the sensing unit in order to determine whether the auxiliary cleaning units operate normally.

7. The robot cleaner according to claim 6, wherein:
when the control unit determines that the one of the auxiliary cleaning units is not operating in accordance with the transmitted command, the control unit repeats operations of the transmitting of the command and the determining of whether the auxiliary cleaning units operate in accordance with the transmitted command until the control unit determines that the auxiliary cleaning units are operating in accordance with the transmitted command or a number of times of the operations reaches a predetermined value; and
when the control unit determines that the one of the auxiliary cleaning units is not operating in accordance with the transmitted command even after the number of times reaches the predetermined value, the control unit determines that the auxiliary cleaning unit does not normally operate.

8. The robot cleaner according to claim 1, wherein, when the control unit determines that the one of the auxiliary cleaning units is not operating normally while the another one of the auxiliary cleaning units is operating normally, for wall tracing travel, the control unit controls travel of the robot cleaner so that the another one of the auxiliary cleaning units travels along the portion including the wall of the cleaning region.

9. The robot cleaner according to claim 1, wherein, when the control unit determines that the one of the auxiliary cleaning units is not operating normally while the another one of the auxiliary cleaning units is operating normally, for zigzag travel, the control unit controls travel of the robot cleaner so that the another one of the auxiliary cleaning units cleans a portion of the cleaning region which is incompletely cleaned after a completion of the zigzag travel.

10. The robot cleaner according to claim 9, wherein the portion of the cleaning region which is incompletely cleaned includes the area adjacent to the edge portion of the cleaning region.

11. The robot cleaner according to claim 1, wherein:
the auxiliary cleaning units comprise an auxiliary cleaning unit mounted to a left side of the robot cleaner and an auxiliary cleaning unit mounted to a right side of the robot cleaner;
when the control unit determines that the left auxiliary cleaning unit is not operating normally while the right auxiliary cleaning unit is operating normally, for spiral travel, the control unit controls travel of the robot cleaner so that the robot cleaner travels in a counter-clockwise direction; and
when the control unit determines that the right auxiliary cleaning unit is not operating normally while the left auxiliary cleaning unit is operating normally, for spiral travel, the control unit controls travel of the robot cleaner such that the robot cleaner travels in a clockwise direction.

12. The robot cleaner according to claim 1, wherein the control unit repeats the determining of whether the auxiliary cleaning units operate normally at predetermined intervals, after the control unit determines that at least one the auxiliary cleaning units does not normally operate normally, and when the control unit determines that all the auxiliary cleaning units operate normally while determining at the predetermined intervals, the control unit controls travel of the robot cleaner to return to an original travel mode.

13. The robot cleaner according to claim 1, further comprising:
an indicator to visibly and audibly notify an abnormal operation of the auxiliary cleaning units when the control unit determines that the at least one auxiliary cleaning unit does not operate normally.

14. A robot cleaner comprising:
first and second auxiliary cleaning units mounted to the robot cleaner, the first and second auxiliary cleaning units being extendable and retractable from the robot cleaner to remove foreign matter from a floor while the robot cleaner travels on the floor to clean a cleaning region;
a sensing unit to, while the robot cleaner travels on the floor to clean the cleaning region, sense operation states of the first and second auxiliary cleaning units, respectively; and
a control unit to, while the robot cleaner travels on the floor to clean the cleaning region,
determine whether the first and second auxiliary cleaning units are operating normally based on the operation states sensed by the sensing unit, and
in response to the control unit determining that the first auxiliary cleaning unit is operating normally while the second auxiliary cleaning unit is not operating normally and thereby the second auxiliary cleaning unit thereby does not properly clean a portion of the cleaning region, control travel of the robot cleaner so that first cleaning unit cleans the portion of the cleaning region.

* * * * *

UNITED STATES PATENT AND TRADEMARK OFFICE
CERTIFICATE OF CORRECTION

Page 1 of 1

PATENT NO. : 9,596,971 B2
APPLICATION NO. : 13/652879
DATED : March 21, 2017
INVENTOR(S) : Sang Sik Yoon et al.

It is certified that error appears in the above-identified patent and that said Letters Patent is hereby corrected as shown below:

In the Claims

Column 22, Line 25, In Claim 12, after "one" insert -- of --.

Column 22, Line 26, In Claim 12, after "not" delete "normally".

Signed and Sealed this
Eighth Day of August, 2017

Joseph Matal
*Performing the Functions and Duties of the*
*Under Secretary of Commerce for Intellectual Property and*
*Director of the United States Patent and Trademark Office*